US011869466B2

(12) United States Patent
Williams

(10) Patent No.: US 11,869,466 B2
(45) Date of Patent: Jan. 9, 2024

(54) SYSTEMS, DEVICES, AND METHODS FOR SEGMENTING A MUSICAL COMPOSITION INTO MUSICAL SEGMENTS

(71) Applicant: Obeebo Labs Ltd., Petaluma, CA (US)

(72) Inventor: Colin P. Williams, Half Moon Bay, CA (US)

(73) Assignee: Obeebo Labs Ltd., Waterloo (CA)

( * ) Notice: Subject to any disclaimer, the term of this patent is extended or adjusted under 35 U.S.C. 154(b) by 0 days.

(21) Appl. No.: 18/094,372

(22) Filed: Jan. 8, 2023

(65) Prior Publication Data

US 2023/0141326 A1 May 11, 2023

Related U.S. Application Data

(63) Continuation of application No. 17/334,753, filed on May 30, 2021, now Pat. No. 11,551,651, which is a continuation of application No. 16/775,241, filed on Jan. 28, 2020, now Pat. No. 11,024,274.

(51) Int. Cl.
*G10H 1/00* (2006.01)
*G10G 1/00* (2006.01)

(52) U.S. Cl.
CPC ............. *G10H 1/0008* (2013.01); *G10G 1/00* (2013.01); *G10H 2210/061* (2013.01); *G10H 2210/066* (2013.01); *G10H 2210/105* (2013.01)

(58) Field of Classification Search
CPC ........... G10H 1/0008; G10H 2210/105; G10H 2210/061; G10H 2210/066; G10G 1/00
See application file for complete search history.

(56) References Cited

U.S. PATENT DOCUMENTS

| | | | | |
|---|---|---|---|---|
| 9,099,064 | B2 * | 8/2015 | Sheffer | G10H 1/0025 |
| 9,183,821 | B2 * | 11/2015 | Matusiak | G10H 1/38 |
| 9,613,605 | B2 * | 4/2017 | Brewer | G10H 7/00 |
| 9,672,800 | B2 * | 6/2017 | Gozzi | G10H 1/0025 |
| 10,629,173 | B2 * | 4/2020 | Yoshino | G10H 1/40 |
| 2006/0080095 | A1 * | 4/2006 | Pinxteren | G06F 16/683<br>704/233 |
| 2009/0151544 | A1 * | 6/2009 | Eggink | G10H 1/0008<br>84/609 |
| 2013/0275421 | A1 * | 10/2013 | Resch | G10L 25/48<br>707/725 |

(Continued)

*Primary Examiner* — Jeffrey Donels
(74) *Attorney, Agent, or Firm* — Thomas Mahon

(57) ABSTRACT

Systems, devices, and methods for segmenting musical compositions are described. Discrete, musically-coherent segments (such as intro, verse, chorus, bridge, solo, and the like) of a musical composition are identified. Distance measures are used to evaluate whether each bar of a musical composition is more like the bars that directly precede it or more like the bars that directly succeed it, and each respective series of musically similar bars is assigned to the same respective segment. Large changes in the distance measure(s) between adjacent bars may be used to identify boundaries between abutting musical segments. Computer systems and computer program products for implementing segmentation are also described. The results of segmentation may advantageously be applied in computer-based composition of music and musical variations, as well as in other applications involving labelling, characterizing, or otherwise processing music.

18 Claims, 13 Drawing Sheets

(56) References Cited

U.S. PATENT DOCUMENTS

| | | | | |
|---|---|---|---|---|
| 2014/0338515 | A1* | 11/2014 | Sheffer | G10H 1/36 84/609 |
| 2014/0366710 | A1* | 12/2014 | Eronen | G10H 1/00 84/609 |
| 2015/0128788 | A1* | 5/2015 | Brewer | G10H 7/00 84/609 |
| 2017/0092248 | A1* | 3/2017 | Gozzi | G10H 1/0025 |
| 2019/0115000 | A1* | 4/2019 | Yoshino | G10H 1/0008 |

* cited by examiner

SYSTEMS, DEVICES, AND METHODS FOR SEGMENTING A MUSICAL COMPOSITION INTO MUSICAL SEGMENTS

CROSS-REFERENCE TO RELATED APPLICATION

This application is a continuation of, and claims the benefit of, U.S. patent application Ser. No. 16/775,241, filed Jan. 28, 2020, titled "SYSTEMS, DEVICES, AND METHODS FOR SEGMENTING A MUSICAL COMPOSITION INTO MUSICAL SEGMENTS", the contents of which are incorporated herein in their entirety by reference.

TECHNICAL FIELD

The present systems, devices, and methods generally relate to working with computer-readable representations of music, and particularly relate to automatically segmenting a computer-readable representation of music into musical segments.

BACKGROUND

Description of the Related Art

Composing Musical Compositions

A musical composition may be characterized by sequences of sequential, simultaneous, and/or overlapping notes that are partitioned into one of more tracks. Starting with an original musical composition, a new musical composition or "variation" can be composed by manipulating the "elements" (e.g., notes, bars, tracks, arrangement, etc.) of the original composition. As examples, different notes may be played at the original times, the original notes may be played at different times, and/or different notes may be played at different times. Further refinements can be made based on many other factors, such as changes in musical key and scale, different choices of chords, different choices of instruments, different orchestration, changes in tempo, the imposition of various audio effects, changes to the sound levels in the mix, and so on.

In order to compose a new musical composition (or variation) based on an original or previous musical composition, it is typically helpful to have a clear characterization of the elements of the original musical composition. In addition to notes, bars, tracks, and arrangements, "segments" are also important elements of a musical composition. In this context, the term "segment" (or "musical segment") is used to refer to a particular sequence of bars (i.e., a subset of serially-adjacent bars) that represents or corresponds to a particular section or portion of a musical composition. A musical segment may include, for example, an intro, a verse, a pre-chorus, a chorus, a bridge, a middle8, a solo, or an outro. The section or portion of a musical composition that corresponds to a "segment" may be defined, for example, by strict rules of musical theory and/or based on the sound or theme of the musical composition.

Musical Notation

Musical notation broadly refers to any application of inscribed symbols to visually represent the composition of a piece of music. The symbols provide a way of "writing down" the elements of a song so that, for example, it can be expressed and stored by a composer and later read and performed by a musician. While many different systems of musical notation have been developed throughout history, the most common form used today is sheet music.

Sheet music employs a particular set of symbols to represent a musical composition in terms of the concepts of modern musical theory. Concepts like: pitch, rhythm, tempo, chord, key, dynamics, meter, articulation, ornamentation, and many more, are all expressible in sheet music. Such concepts are so widely used in the art today that sheet music has become an almost universal language in which musicians communicate. Sheet music may or may not include annotations showing the segments of a musical composition.

Digital Audio File Formats

While it is common for human musicians to communicate musical compositions in the form of sheet music, it is uncommon for computers to do so. Computers typically store and communicate music in well-established digital audio file formats, such as .mid, .wav, or .mp3 (just to name a few), that are designed to facilitate communication between electronic instruments and other devices by allowing for the efficient movement of musical waveforms over computer networks. In a digital audio file format, audio data is typically encoded in one of various audio coding formats (which may be compressed or uncompressed) and either provided as a raw bitstream or, more commonly, embedded in a container or wrapper format. When the audio data corresponds to a musical composition, the audio data usually corresponds to a particular instance (e.g., a particular performance or recording) of the musical composition with all of the nuance and expression specific to that particular instance. The audio data in well-established audio file formats typically does not capture most (or any) of the higher-level musical characteristics of the musical composition that may be represented in sheet music, such as musical segments. On the other hand, sheet music typically does not capture the nuance or expression that can characterize a particular instance of a musical composition and make it stand out among other instances of the same composition, such as small imperfections or intentional variations in timing or rhythm.

BRIEF SUMMARY

A computer-implemented method of segmenting a musical composition into musical segments, wherein the musical composition comprises a sequence of bars, may be summarized as including: for each $j^{th}$ bar of the musical composition and for at least one (m, n) value combination where m, n≥0: determining a first measure of similarity between the $j^{th}$ bar and a set of m bars that directly precede the $j^{th}$ bar in the musical composition; determining a second measure of similarity between the $j^{th}$ bar and a set of n bars that directly succeed the $j^{th}$ bar in the musical composition; and one of: if the first measure of similarity satisfies at least a first criterion, assigning the $j^{th}$ bar to a first musical segment; or if the second measure of similarity satisfies at least a second criterion, assigning the $j^{th}$ bar to a second musical segment. Determining a first measure of similarity between the $j^{th}$ bar and a set of m bars that directly precede the $j^{th}$ bar in the musical composition may include: i) determining a respective measure of similarity between the $j^{th}$ bar and each respective bar in the set of m bars that directly precede the $j^{th}$ bar in the musical composition; and ii) determining, as the first measure of similarity, a property of the respective measures of similarity between the $j^{th}$ bar and each respective bar in the set of m bars that directly precede the $j^{th}$ bar in the musical composition. Determining a second measure of similarity between the $j^{th}$ bar and a set of n bars that directly succeed the $j^{th}$ bar in the musical composition may include: i) determining a respective measure of similarity between the $j^{th}$ bar and each respective bar in the set of n bars that directly succeed the $j^{th}$ bar in the musical composition; and ii) determining, as the second measure of similarity, a property of the respective measures of similarity between the $j^{th}$ bar and each respective bar in the set of n bars that directly succeed the $j^{th}$ bar in the musical composition. Determining a respective measure of similarity between the $j^{th}$ bar and each respective bar in the set of m bars that directly precede the $j^{th}$ bar in the musical composition may include determining a respective correlation distance between the $j^{th}$ bar and each respective bar in the set of m bars that directly precede the $j^{th}$ bar in the musical composition. Determining, as the first measure of similarity, a property of the respective measures of similarity between the $j^{th}$ bar and each respective bar in the set of m bars that directly precede the $j^{th}$ bar in the musical composition may include determining, as the first measure of similarity, a minimum of the respective correlation distances between the $j^{th}$ bar and each respective bar in the set of m bars that directly precede the $j^{th}$ bar in the musical composition. Determining a respective measure of similarity between the $j^{th}$ bar and each respective bar in the set of n bars that directly succeed the $j^{th}$ bar in the musical composition may include determining a respective correlation distance between the $j^{th}$ bar and each respective bar in the set of n bars that directly succeed the $j^{th}$ bar in the musical composition. Determining, as the second measure of similarity, a property of the respective measures of similarity between the $j^{th}$ bar and each respective bar in the set of n bars that directly succeed the $j^{th}$ bar in the musical composition may include determining, as the second measure of similarity, a minimum of the respective correlation distances between the $j^{th}$ bar and each respective bar in the set of n bars that directly succeed the $j^{th}$ bar in the musical composition. Determining a respective measure of similarity between the $j^{th}$ bar and each respective bar in the set of m bars that directly precede the $j^{th}$ bar in the musical composition may include, for each track of each bar in the set of m bars that directly precede the $j^{th}$ bar in the musical composition, at least one of: i) for each respective note in the track, determining a respective product of note duration multiplied by note volume and determining a sum of the respective products; and/or ii) sorting all notes by note start time and, for each note start time, sorting all corresponding notes by note pitch, wherein sorting all corresponding notes by note pitch includes ignoring octave information for each note. Similarly, determining a respective measure of similarity between the $j^{th}$ bar and each respective bar in the set of n bars that directly succeed the $j^{th}$ bar in the musical composition may include, for each track of each bar in the set of n bars that directly succeed the $j^{th}$ bar in the musical composition, at least one of: i) for each respective note in the track, determining a respective product of note duration multiplied by note volume and determining a sum of the respective products; and/or ii) sorting all notes by note start time and, for each note start time, sorting all corresponding notes by note pitch, wherein sorting all corresponding notes by note pitch includes ignoring octave information for each note.

The method may further include repeating, for multiple different (m, n) value combinations: determining a first measure of similarity between the $j^{th}$ bar and a set of m bars that directly precede the $j^{th}$ bar in the musical composition; determining a second measure of similarity between the $j^{th}$ bar and a set of n bars that directly succeed the $j^{th}$ bar in the musical composition; and one of: if the first measure of similarity satisfies at least a first criterion, assigning the $j^{th}$ bar to a first musical segment; or if the second measure of similarity satisfies at least a second criterion, assigning the $j^{th}$ bar to a second musical segment. The method may further include: tallying a number of (m, n) value combinations that result in the $j^{th}$ bar being assigned to the first musical segment; tallying a number of (m, n) value combinations that result in the $j^{th}$ bar being assigned to the second musical segment; and one of: if the number of (m, n) value combinations that result in the $j^{th}$ bar being assigned to the first musical segment is greater than the number of (m, n) value combinations that result in the $j^{th}$ bar being assigned to the second musical segment, assigning the $j^{th}$ bar to the first musical segment; or if the number of (m, n) value combinations that result in the $j^{th}$ bar being assigned to the second musical segment is greater than the number of (m, n) value combinations that result in the $j^{th}$ bar being assigned to the first musical segment, assigning the $j^{th}$ bar to the second musical segment.

The first criterion may include a first threshold value that is representative of a measure of distance between the $j^{th}$ bar and the set of m bars that directly precede the $j^{th}$ bar in the musical composition. The second criterion may include a second threshold value that is representative of a measure of distance between the $j^{th}$ bar and the set of n bars that directly succeed the $j^{th}$ bar in the musical composition.

The musical composition may comprise a sequence of X bars, where X is an integer greater than 2, wherein: for a first (j=1) bar of the musical composition m=0; for a last (j=X) bar of the musical composition n=0; and for all other bars ($1<j<X$) of the musical composition, m, n>0.

Assigning the $j^{th}$ bar to a first musical segment may include assigning the $j^{th}$ bar to a same musical segment as a $(j-1)^{th}$ bar that directly precedes the $j^{th}$ bar in the musical composition. Assigning the $j^{th}$ bar to a second musical segment may include assigning the $j^{th}$ bar to a same musical segment as a $(j+1)^{th}$ bar that directly succeeds the $j^{th}$ bar in the musical composition.

A computer-implemented method of segmenting a musical composition into musical segments, wherein the musical composition comprises a sequence of bars, may be summarized as including: identifying, for at least one (m, n) value combination where m, n≥0, respective pairs of adjacent bars in the musical composition for which: a first bar is correlated more strongly to a set of m bars that directly precede the first bar in the musical composition than to a set of n bars that directly succeed the first bar in the musical composition; and a second bar is correlated more strongly to a set of n bars that directly succeed the second bar in the musical composition than to a set of m bars that directly precede the second bar in the musical composition, wherein the first bar directly precedes the second bar in the musical composition; assigning each respective first bar to a respective first musical segment; and assigning each respective second bar to a respective second musical segment.

The method may further include: determining a respective feature of each bar; determining a respective correlation distance between the respective feature of each bar and the respective features of a set of m bars that directly precede the bar in the musical composition for at least one value of m; and determining a respective correlation distance between the respective feature of each bar and the respective features of a set of n bars that directly succeed the bar in the musical composition for at least one value of n. Determining a respective feature of each bar may include, for each respective track in the bar, at least one of: i) for each respective note in the track, determining a respective product of note duration multiplied by note volume and determining a sum of the respective products; and/or ii) sorting all notes by note start time and, for each note start time, sorting all corresponding notes by note pitch, wherein sorting all corresponding notes by note pitch includes ignoring octave information for each note.

The method may further include repeating, for multiple (m, n) value combinations, the identifying respective pairs of adjacent bars in the musical composition for which: a first bar is correlated more strongly to a set of m bars that directly precede the first bar in the musical composition than to a set of n bars that directly succeed the first bar in the musical composition; and a second bar is correlated more strongly to a set of n bars that directly succeed the second bar in the musical composition than to a set of m bars that directly precede the second bar in the musical composition. The method may further include, for each bar: tallying a number of (m, n) value combinations that result in the bar being identified as a first bar that is correlated more strongly to a set of m bars that directly precede the first bar in the musical composition than to a set of n bars that directly succeed the first bar in the musical composition; and tallying a number of (m, n) value combinations that result in the bar being identified as a second bar that is correlated more strongly to a set of n bars that directly succeed the second bar in the musical composition than to a set of m bars that directly precede the second bar in the musical composition. For each bar: assigning each respective first bar to a respective first musical segment may include assigning the bar to the first musical segment if the number of (m, n) value combinations that result in the bar being identified as a first bar exceeds a first threshold; and assigning each respective second bar to a respective second musical segment may include assigning the bar to the second musical segment if the number of (m, n) value combinations that result in the bar being identified as a second bar exceeds a second threshold. The method may further include, for each bar: if the number of (m, n) value combinations that result in the bar being identified as a first bar does not exceed the first threshold and the number of (m, n) value combinations that result in the bar being identified as a second bar does not exceed the second threshold, assigning the bar to a same musical segment as both a bar that directly precedes the bar in the musical composition and a bar that directly succeeds the bar in the musical composition.

Assigning each respective first bar to a respective first musical segment may include assigning each respective first bar to a same musical segment as a bar that directly precedes the first bar in the musical composition. Assigning each respective second bar to respective second musical segment may include assigning each respective second bar to a same musical segment as a bar that directly succeeds the second bar in the musical composition.

A computer-implemented method of segmenting a musical composition into musical segments, wherein the musical composition comprises a sequence of bars bi from i=1 to i=X, may be summarized including: assigning a first bar b1 of the musical composition to a first musical segment; for each successive bar bi of the musical composition from i=2 to i=(X−1) and for at least one (m, n) value combination where m, n>0: determining a first measure of similarity between the bar bi and a set of m bars that directly precede the bar bi in the musical composition; determining a second measure of similarity between the bar bi and a set of n bars that directly succeed the bar bi in the musical composition; and one of: if the first measure of similarity satisfies at least a first criterion, assigning the bar bi to a same musical segment as that to which a bar b(i−1) that directly precedes the bar bi in the musical composition is assigned; or if the second measure of similarity satisfies at least a second criterion, assigning the bar bi to an additional musical segment; and for a last bar bX of the musical composition and for at least one value of m: determining a third measure of similarity between the last bar bX and a set of m bars that directly precede the last bar bX in the musical composition; and one of: if the third measure of similarity satisfies at least a third criterion, assigning the last bar bX to a same musical segment as a bar b(X−1) that directly precedes the last bar bX in the musical composition; or if the third measure of similarity does not satisfy the third criterion, assigning the last bar bX to a last musical segment.

Determining a first measure of similarity between the bar bi and a set of m bars that directly precede the bar bi in the musical composition may include: i) determining a respective measure of similarity between the bar bi and each respective bar {b(i−1), . . . , b(i−m)} in the set of m bars that directly precede the bar bi in the musical composition; and ii) determining, as the first measure of similarity, a property of the respective measures of similarity between the bar bi and each respective bar {b(i−1), . . . , b(i−m)} in the set of m bars that directly precede the bar bi in the musical composition. Determining a second measure of similarity between the bar bi and a set of n bars that directly succeed the bar bi in the musical composition may include: i) determining a respective measure of similarity between the bar bi and each respective bar {b(i+1), . . . , b(i+n)} in the set of n bars that directly succeed the bar bi in the musical composition; and ii) determining, as the second measure of similarity, a property of the respective measures of similarity between the bar bi and each respective bar {b(i+1), . . . , b(i+n)} in the set of n bars that directly succeed the bar bi in the musical composition. Determining a respective measure of similarity between the bar bi and each respective bar {b(i−1), . . . , b(i−m)} in the set of m bars that directly precede the bar bi in the musical composition may include determining a respective correlation distance between the bar bi and each respective bar {b(i−1), . . . , b(i−m)} in the set of m bars that directly precede the bar bi in the musical composition. Determining, as the first measure of similarity, a property of the respective measures of similarity between the bar bi and each respective bar {b(i−1), . . . , b(i−m)} in the set of m bars that directly precede the bar bi in the musical composition may include determining, as the first measure of similarity, a minimum of the respective correlation distances between the bar and each respective bar {b(i−1), . . . , b(i−m)} in the set of m bars that directly precede the bar bi in the musical composition. Determining a respective measure of similarity between the bar bi and each respective bar {b(i+1), . . . , b(i+n)} in the set of n bars that directly succeed the bar bi in the musical composition may include determining a respective correlation distance between the bar bi and each respective bar {b(i+1), . . . , b(i+n)} in the set of n bars that directly succeed the bar bi in the musical composition. Determining, as the second measure of similarity, a property of the respective measures of similarity between the bar bi and each respective bar {b(i+1), . . . , b(i+n)} in the set of n bars that directly succeed the bar bi in the musical composition may include determining, as the second measure of similarity, a minimum of the respective correlation distances between the bar bi and each respective bar {b(i+1), . . . , b(i+n)} in the set of n bars that directly succeed the bar bi in the musical composition.

Determining a respective measure of similarity between the bar bi and each respective bar {b(i−1), . . . , b(i−m)} in the set of m bars that directly precede the bar bi in the musical composition may include, for each track of each bar {b(i−1), . . . , b(i−m)} in the set of m bars that directly precede the bar bi in the musical composition: for each respective note in the track, determining a respective product of note duration multiplied by note volume; and determining a sum of the respective products. Determining a respective measure of similarity between the bar bi and each respective bar {b(i+1), . . . , b(i+n)} in the set of n bars that directly succeed the bar bi in the musical composition may include, for each track of each bar {b(i+1), . . . , b(i+n)} in the set of n bars that directly succeed the bar bi in the musical composition: for each respective note in the track, determining a respective product of note duration multiplied by note volume; and determining a sum of the respective products.

Determining a respective measure of similarity between the bar bi and each respective bar {b(i−1), . . . , b(i−m)} in the set of m bars that directly precede the bar bi in the musical composition may include, for each track of each bar {b(i−1), . . . , b(i−m)} in the set of m bars that directly precede the bar bi in the musical composition: sorting all notes by note start time; and for each note start time, sorting all corresponding notes by note pitch, wherein sorting all corresponding notes by note pitch includes ignoring octave information for each note. Determining a respective measure of similarity between the bar bi and each respective bar {b(i+1), . . . , b(i+n)} in the set of n bars that directly succeed the bar bi in the musical composition may include, for each track of each bar {b(i+1), . . . , b(i+n)} in the set of n bars that directly succeed the bar bi in the musical composition: sorting all notes by note start time; and for each note start time, sorting all corresponding notes by note pitch, wherein sorting all corresponding notes by note pitch includes ignoring octave information for each note.

The method may further include repeating, for multiple (m, n) value combinations: determining a first measure of similarity between the bar bi and a set of m bars that directly precede the bar bi in the musical composition; determining a second measure of similarity between the bar bi and a set of n bars that directly succeed the bar bi in the musical composition; and one of: if the first measure of similarity satisfies at least a first criterion, assigning the bar bi to a same musical segment as that to which a bar b(i−1) that directly precedes the bar bi in the musical composition is assigned; or if the second measure of similarity satisfies at least a second criterion, assigning the bar bi to an additional musical segment. The method may further include: for each bar bi, tallying a respective number of (m, n) value combinations that result in the bar bi being assigned to each respective musical segment; and for each bar bi, assigning the bar bi to a musical segment with a largest corresponding tally.

The first criterion may include a first threshold value that is representative of a measure of distance between the bar bi, where i=2 to X, and the set of m bars that directly precede the bar bi in the musical composition and the second criterion may include a second threshold value that is representative of a measure of distance between the bar bi, where i=2 to (X−1), and the set of n bars that directly succeed the bar bi in the musical composition.

BRIEF DESCRIPTION OF THE SEVERAL VIEWS OF THE DRAWINGS

The various segments and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
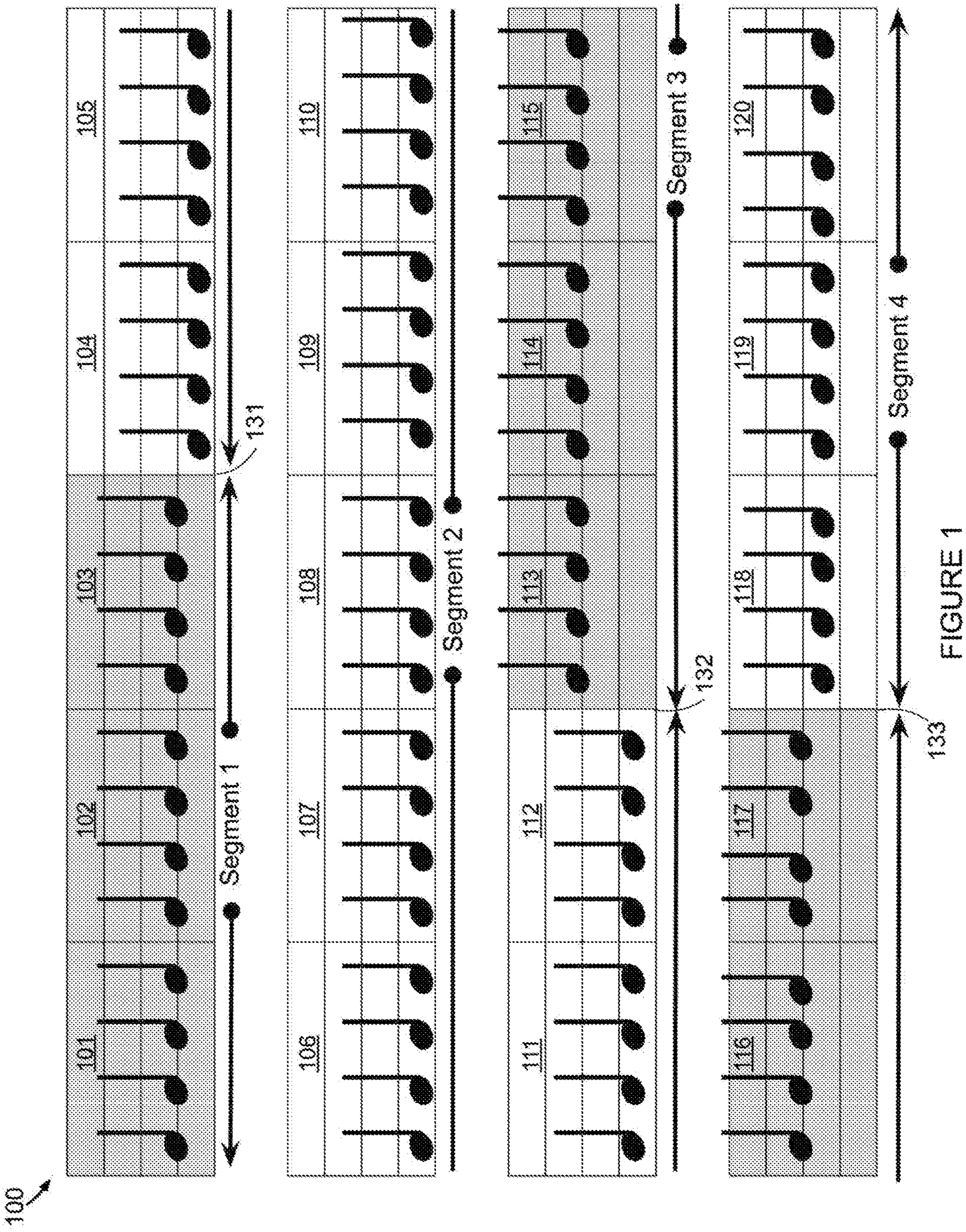
FIG. 1 is an illustrative diagram showing a simplified sheet music representation of a basic musical composition.

The following description sets forth specific details in order to illustrate and provide an understanding of the various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The various embodiments described herein provide systems, devices, and methods for segmenting a musical composition into musical segments. More specifically, the various embodiments described herein provide systems, devices, and methods for analyzing a musical composition in computer-readable form and automatically determining the musical segments of such musical composition. Thus, throughout this specification and the appended claims the term "segmenting" is used to mean "determining the musical segments of." The computer-readable form of the musical composition being segmented may include any of a wide range of digital audio file formats, including without limitation: .mid, .mp3, .wav, and advantageously, the .hum format described in U.S. patent application Ser. No. 16/448,130, which is incorporated herein by reference in its entirety.

As will be described in more detail below, the systems, devices, and methods for segmenting a musical composition described herein are particularly well-suited for use in computer-based composition of music, where such composition may be performed manually by a human user of a computer system, automatically by algorithms and software (e.g., employing artificial intelligence techniques) executed by the computer system, or by a combination of both manual (i.e., human-based) and automatic (e.g., AI-based) process steps. Algorithms and software for automatic computer-based composition of music exist in the art today but the compositions they produce tend to sound formulaic and unnatural/uninteresting to human listeners. The various implementations described herein enable computer algorithms and software to compose more sophisticated music, and in particular more sophisticated musical variations of a first musical composition, by enabling such computer algorithms and software to interact with and manipulate the musical segments that make up the arrangement of a musical composition. The result is improved functioning of computer systems for the specific practical application of composing music, and therefore computer-composed music that humans can more readily enjoy.

FIG. 1 is an illustrative diagram showing a simplified sheet music representation of a basic musical composition 100. Musical composition 100 comprises 20 bars 101, 102, 103, 104, 105, 106, 107, 108, 109, 110, 111, 112, 113, 114, 115, 116, 117, 118, 119, and 120 each with a respective set of musical notes (not called out in FIG. 1 to reduce clutter). For the purpose of illustration, the sheet music representation of musical composition 100 is annotated showing four musical segments: Segment 1 comprising bars 101, 102, and 103; Segment 2 comprising bars 104, 105, 106, 107, 108, 109, 110, 111, and 112; Segment 3 comprising bars 113, 114, 115, 116, and 117, and Segment 4 comprising bars 118, 119, and 120. Segment 1 and Segment 3 are highlighted in grey to more readily visually distinguish from Segment 2 and Segment 4. In this simple example, Segment 1 may correspond to an intro of musical composition 100, Segment 2 may correspond to a verse of musical composition 100, Segment 3 may correspond to a chorus of musical composition 100, and Segment 4 may correspond to an outro of musical composition 100.

Throughout this specification and the appended claims, unless the specific context requires otherwise the term "bar" is generally used to refer to a musical bar; i.e., a portion of time comprising a set number of beats from a musical composition. The number of beats in a bar depends on the time signature for the musical composition. A person of skill in the art will appreciate that the parameters of a bar may include any or all concepts used to characterize bars in modern musical theory, including without limitation: bar index, time signature, beats per minute, duration, start time, stop time, beat times, key, scale, chords, tracks, sequence of notes, and (if applicable) sequence of percussion events.

Throughout this specification and the appended claims, unless the specific context requires otherwise the term "note" is generally used to refer to a musical note (such as Ab, A, A#, Bb, B, C, C#, Db, D, D#, Eb, E, F, F#, Gb, G, G# (of any octave), and theoretical notes such as Cb, which is enharmonic to B) and is inclusive of rests (i.e., a note with a certain timing but no pitch or volume). A person of skill in the art will appreciate that the parameters of a note may include any or all concepts used to characterize notes in modern musical theory, including without limitation: pitch, start time, stop time, duration, volume, attack, reverb, decay, sustain, and instrument (e.g., tone, timbre, relative harmonics, and the like).

A musical composition may include percussion events that are used to impart rhythm. Throughout this specification and the appended claims, unless the specific context requires otherwise the term "note" is inclusive of percussion events. A percussion event may be defined or characterized by note parameters that generally do not include a pitch and generally specify a percussion instrument as the instrument.

In musical composition 100, no two segments overlap and clear boundaries exist in between adjacent bars in adjacent pairs of segments. Specifically: boundary 131 exists between bar 103 at the end of Segment 1 and bar 104 at the beginning of Segment 2; boundary 132 exists between bar 112 at the end of Segment 2 and bar 113 at the beginning of Segment 3; and boundary 133 exists between bar 117 at the end of Segment 3 and bar 118 at the beginning of Segment 4.

As previously described, the section or portion of a musical composition that corresponds to a "segment" may be defined, for example, by strict rules of musical theory and/or based on the sound or theme of the musical composition. This aspect is very crudely demonstrated in FIG. 1, wherein Segment 1 of musical composition 100 comprises all notes of a first pitch, Segment 2 of musical composition 100 comprises all notes of a second pitch, Segment 3 of musical composition 100 comprises all notes of a third pitch, and Segment 4 of musical composition 100 comprises all notes of a fourth pitch. Thus, boundary 131 represents a detectable transition from notes of the first pitch (i.e., in bar 103) to notes of the second pitch (i.e., in bar 104). Likewise, boundary 132 represents a detectable transition from notes of the second pitch (i.e., in bar 112) to notes of the third pitch (i.e., in bar 113) and boundary 133 represents a detectable transition from notes of the third pitch (i.e., in bar 117) to notes of the fourth pitch (i.e., in bar 118). A person of skill in the art will appreciate that boundaries 131, 132, and 133 of musical composition 100 are characterized by very rudimentary musical transitions between simple notes of different pitch, whereas in practice the boundaries between musical segments may be marked by significantly more complexity (such as changes in key, timing, instrumentation, number of active tracks, and so on). Indeed, the various embodiments described herein provide systems, devices, and methods that are particularly advantageous for analyzing and automatically determining the musical segments of complex musical compositions.

Figure 2A:
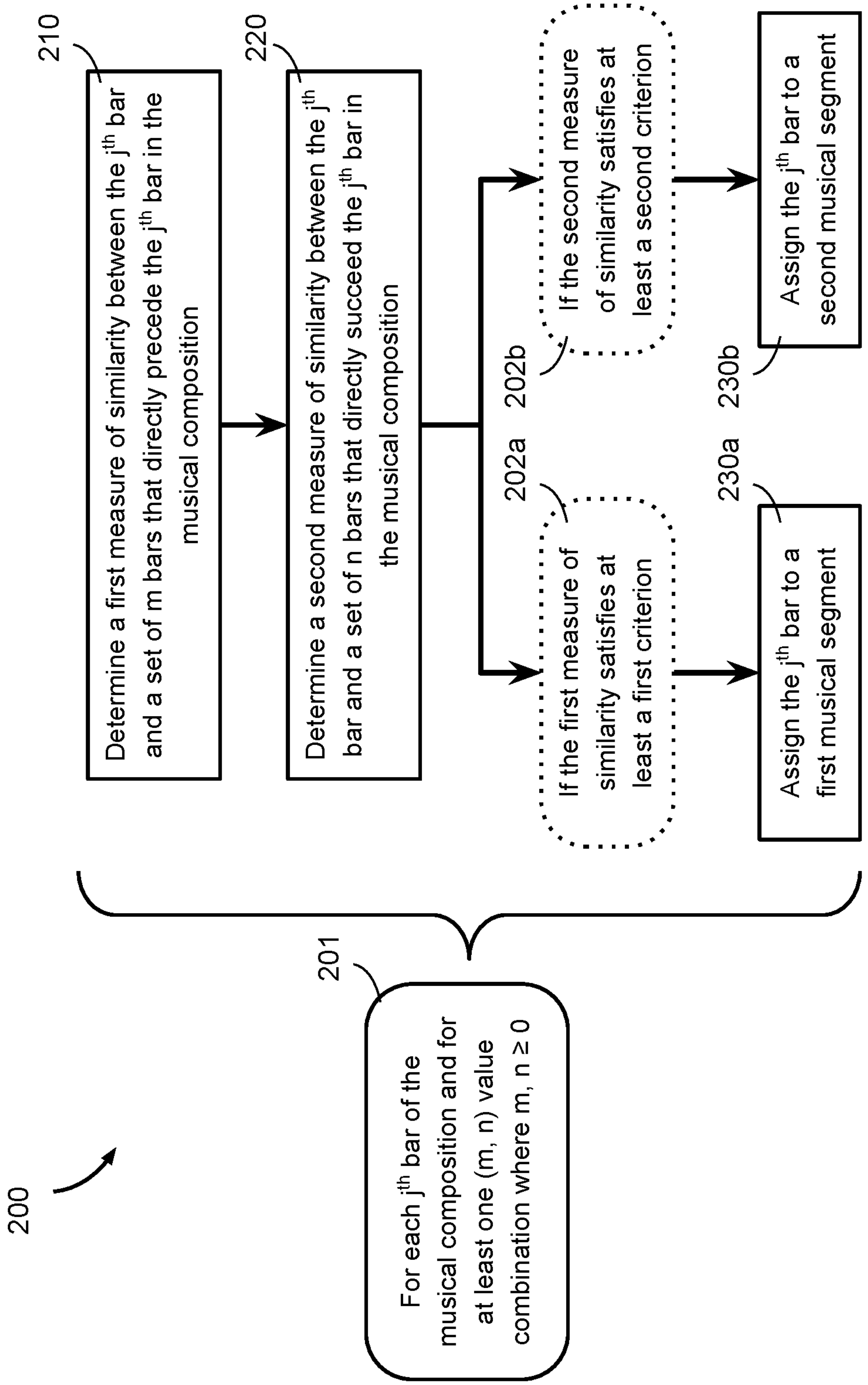
FIG. 2A is a flow diagram showing an exemplary computer-implemented method of segmenting a musical composition into musical segments in accordance with the present systems, devices, and methods.
Figure 5:
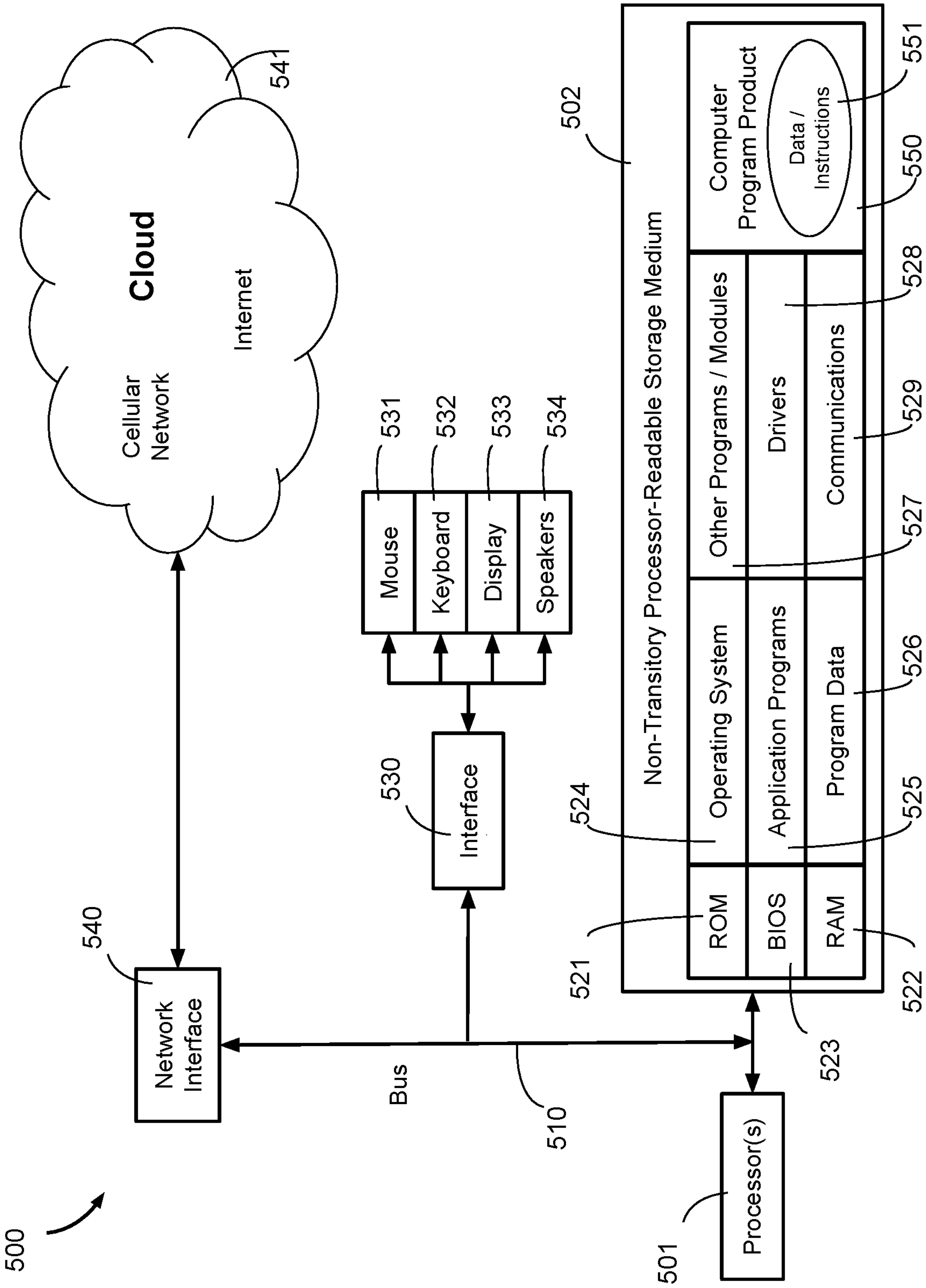
FIG. 5 is an illustrative diagram of a processor-based computer system suitable at a high level for segmenting a musical composition in accordance with the present systems, devices, and methods.

FIG. 2A is a flow diagram showing an exemplary computer-implemented method 200 of segmenting a musical composition into musical segments in accordance with the present systems, devices, and methods. In general, throughout this specification and the appended claims, a computer-implemented method is a method in which at least some of the constituent acts are performed by one or more processor-based computer system(s), even if such acts are not explicitly described as being performed by one or more processor-based computer system(s). For example, certain acts of a computer-implemented method may be performed by at least one processor communicatively coupled to at least one non-transitory processor-readable storage medium or memory (hereinafter referred to as a non-transitory processor-readable storage medium) and, in some implementations, certain acts of a computer-implemented method may be performed by peripheral components of the computer system that are communicatively coupled to the at least one processor, such as interface devices, sensors, communications and networking hardware, and so on. The non-transitory processor-readable storage medium may store data and/or processor-executable instructions that, when executed by the at least one processor, cause the computer system to perform the method and/or cause the at least one processor to perform those acts of the method that are performed by the at least one processor. FIG. 5, and the written descriptions thereof, provide illustrative examples of computer systems that are suitable to perform the computer-implemented methods described herein.

The musical composition being segmented by method 200 comprises a sequence of bars such as, for example, musical composition 100 from FIG. 1. Method 200 includes one specification 201, two acts 210 and 220, two criteria or conditions 202*a* and 202*b*, and two conditional acts 230*a* and 230*b*. Those of skill in the art will appreciate that in alternative implementations certain specifications, acts, criteria, and/or conditional acts may be omitted and/or additional specifications, acts, criteria, and/or conditional acts may be added. Those of skill in the art will also appreciate that the illustrated order of the specifications, acts, criteria, and/or conditional acts is shown for exemplary purposes only and may change in alternative implementations.

At 201, it is specified that acts 210 and 220 and (either of) conditional acts 230*a*/230*b* are all carried out for each $j^{th}$ bar of the musical composition and for at least one (m, n) value combination where m, n≥0. For example, if the musical composition comprises X bars then acts 210 and 220 and (either of) conditionals acts 230*a*/230*b* are carried out for the first (j=1) bar, the second (j=2) bar, the third (j=3) bar, and so on, right up to the last (j=X) bar, though it is not necessarily required that the bars be addressed or treated in such sequential order. In any given iteration or instance of acts 210 and 220 and (either of) conditionals acts 230*a*/230*b*, the bar for which acts 210 and 220 and (either of) conditionals acts 230*a*/230*b* are carried out serves as the $j^{th}$ bar. As a more specific example, if method 200 is applied to musical composition 100 of FIG. 1 then acts 210 and 220 and (either of) conditionals acts 230*a*/230*b* are carried out for each of bars 101, 102, 103, 104, 105, 106, 107, 108, 109, 110, 111, 112, 113, 114, 115, 116, 117, 118, 119, and 120, though not necessarily in that order. When acts 210 and 220 and (either of) conditionals acts 230*a*/230*b* are carried out for bar 101 then bar 101 is the $j^{th}$ bar, when acts 210 and 220 and (either of) conditionals acts 230*a*/230*b* are carried out for bar 102 then bar 102 is the $j^{th}$ bar, and so on.

At 210, a first measure of similarity between the $j^{th}$ bar and a set of m bars that directly precede the $j^{th}$ bar in the musical composition is determined. At 220, a second measure of similarity between the $j^{th}$ bar and a set of n bars that directly succeed the $j^{th}$ bar in the musical composition is determined. Either or both of acts 210 and/or 220 may be performed by at least one processor of a processor-based system. The determination of measures of similarity between bars will be discussed in more detail later on.

At 210 and 220, the values of m and n, respectively, may depend on the specific implementation of method 200 and/or on the specific position of the $j^{th}$ bar in the musical composition. If the musical composition comprises a sequence of X bars (where X is an integer greater than 2), then generally: m=0 for a first (j=1) bar of the musical composition because there are no bars that precede the first (j=1) bar in the musical composition; n=0 for the last (j=X) bar of the musical composition because there are no bars that succeed the last (j=X) bar of the musical composition; and m, n>0 for all other bars (1<j<X) of the musical composition. A simple illustration of exemplary (m, n) values for a $j^{th}$ bar is shown in FIG. 2B.

Figure 2B:
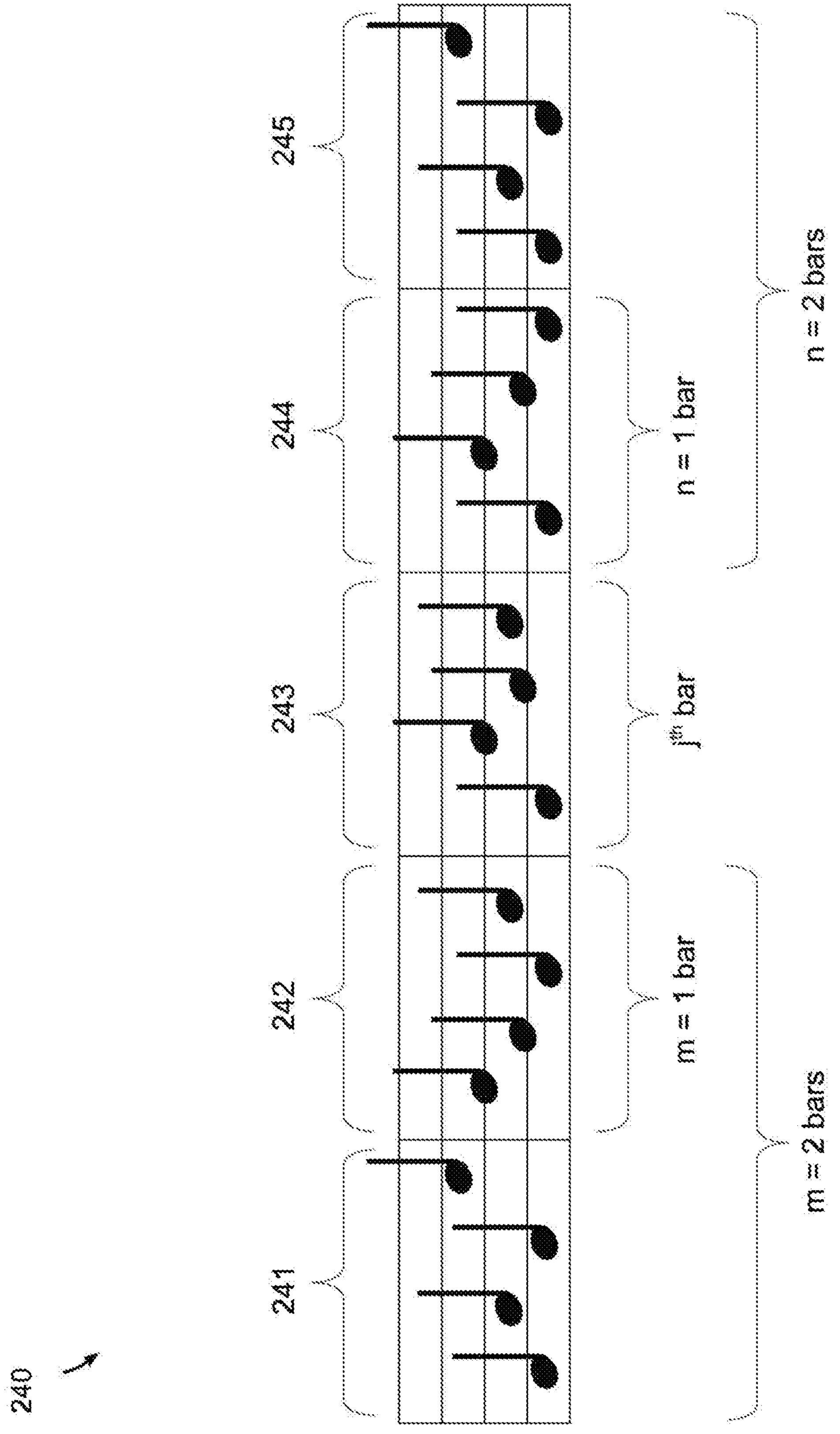
FIG. 2B is an illustrative diagram showing an arbitrary sequence of five (X=5) bars from an exemplary musical composition.

FIG. 2B is an illustrative diagram showing an arbitrary sequence of five (X=5) bars 241, 242, 243, 244, and 245 from an exemplary musical composition 240. FIG. 2B shows that when bar 243 is the $j^{th}$ bar, the m bars that precede the $j^{th}$ bar may include bar 242 for m=1 and, additionally, bar 241 for m=2 because both bars 242 and 241 directly precede bar 243 in musical composition 200. Likewise, when bar 243 is the $j^{th}$ bar the n bars that succeed the $j^{th}$ bar may include bar 244 for n=1 and, additionally, bar 245 for n=2 because both bars 244 and 245 directly succeed bar 243 in musical composition 200.

Returning to FIG. 2A, for any given $j^{th}$ bar method 200 proceeds from acts 210 and 220 to either conditional act 230*a* or conditional act 230*b* depending on whether criterion/condition 202*a* or criterion/condition 202*b* is satisfied. That is, method 200 proceeds to conditional act 230*a* if the first measure of similarity determined at 210 satisfies at least a first criterion (criterion/condition 202*a*) or, alternatively, method 200 proceeds to conditional act 230*b* if the second measure of similarity determined at 220 satisfies at least a second criterion (criterion/condition 202*b*). The first criterion (202*a*) and the second criterion (202*b*) may be constructed in such a way that both cannot be satisfied simultaneously and, therefore, for any given $j^{th}$ bar only one of conditional acts 230*a* or 230*b* is carried out. For example, the first criterion (202*a*) and the second criterion (202*b*) may relate to the same property or may otherwise be comparative to one another.

At 230*a*, which is only carried out if the first measure of similarity determined at 210 satisfies at least a first criterion (criterion/condition 202*a*), the $j^{th}$ bar is assigned to a first musical segment. In some implementations, the first measure of similarity determined at 210 may evaluate, represent, or indicate how "musically similar" the $j^{th}$ bar is to the m bars that directly precede the $j^{th}$ bar in the musical composition. In such implementations, the first musical segment may correspond to a same musical segment as all, or at least some of, the m bars that directly precede the $j^{th}$ bar in the musical composition. In other words, for all m>0, if the first measure of similarity determined at 210 satisfies at least a first criterion (criterion/condition 202*a*), then this may indicate that the $j^{th}$ bar is "musically similar" to the m bars (i.e., at least the $(j-1)^{th}$ bar) that directly precede the $j^{th}$ bar in the musical composition and therefore at 230*a* the $j^{th}$ bar may be assigned to a same segment (i.e., the first segment) as the m bars (i.e., at least the $(j-1)^{th}$ bar) that directly precede the $j^{th}$ bar in the musical composition.

At 230*b*, which is only carried out if the second measure of similarity determined at 220 satisfies at least a second criterion (criterion/condition 202*b*), the $j^{th}$ bar is assigned to a second musical segment. The second musical segment may be different from the first musical segment. In some implementations, the second measure of similarity determined at 220 may evaluate, represent, or indicate how "musically similar" the $j^{th}$ bar is to the n bars that directly succeed the $j^{th}$ bar in the musical composition. In such implementations, the second musical segment may correspond to a same musical segment as all, or at least some of, the n bars that directly succeed the $j^{th}$ bar in the musical composition. In other words, for all n>0, if the second measure of similarity determined at 220 satisfies at least a second criterion (criterion/condition 202*b*), then this may indicate that the $j^{th}$ bar is "musically similar" to the n bars (i.e., at least the $(j+1)^{th}$ bar) that directly succeed the $j^{th}$ bar in the musical composition and therefore at 230*b* the $j^{th}$ bar may be assigned to a same segment (i.e., the second segment) as the n bars (i.e., at least the $(j+1)^{th}$ bar) that directly succeed the $j^{th}$ bar in the musical composition. Thus, if a $j^{th}$ bar satisfies the first criterion 202*a* then the $j^{th}$ bar may be deemed "more musically similar to the m bars that precede the $j^{th}$ bar than to the n bars that succeed the $j^{th}$ bar" and grouped into a same musical segment as at least the $(j-1)^{th}$ bar. Likewise, if a $j^{th}$ bar satisfies the second criterion 202*b* then the $j^{th}$ bar may be deemed "more musically similar to the n bars that succeed the $j^{th}$ bar than to the m bars that precede the $j^{th}$ bar" and grouped into a same musical segment as at least the $(j+1)^{th}$ bar.

Figure 2C:
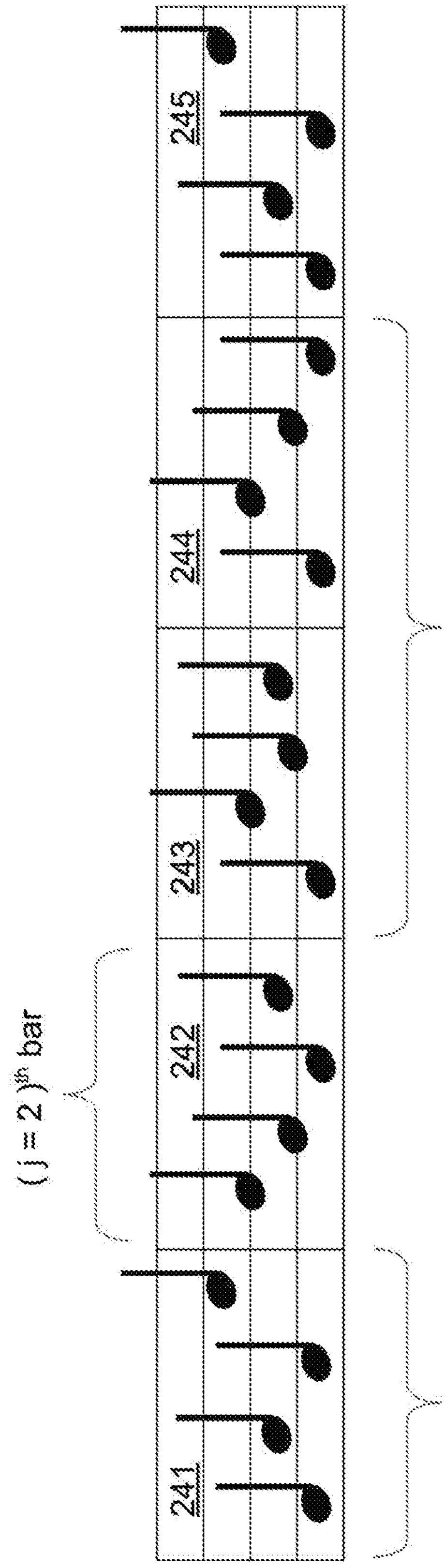
FIG. 2C is an illustrative diagram showing an instance of the method from FIG. 2A being carried out on the same arbitrary sequence of five (X=5) bars from FIG. 2B, with an exemplary (m, n) value combination of (1, 2) in accordance with the present systems, devices, and methods.
Figure 2D:
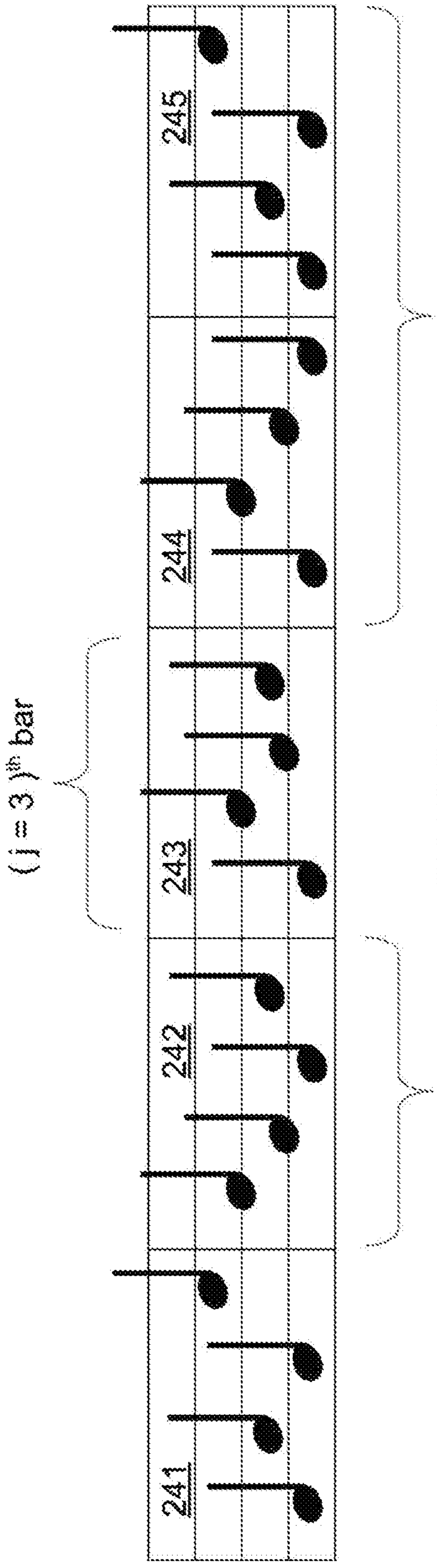
FIG. 2D is an illustrative diagram showing another instance of the method from FIG. 2A being carried out on the same arbitrary sequence of five (X=5) bars from FIG. 2B, with an exemplary (m, n) value combination of (1, 2) in accordance with the present systems, devices, and methods.

As previously described, 201 of method 200 specifies that acts 210 and 220 and (either of) conditionals acts 230*a*/230*b* are carried out for each $j^{th}$ bar in the musical composition. In some implementations of method 200, acts 210 and 220 and (either of) conditional acts 230*a*/230*b* are carried out for every bar in the musical composition, and when any given bar is having acts 210 and 220 and (either of) conditional acts 230*a*/230*b* carried out thereon/therewith then such bar is referred to as a $j^{th}$ bar. FIGS. 2C and 2D illustrate an example of method 200 being carried out on a first bar and on a second bar.

Throughout this specification and the appended claims, the term "first" and related similar terms, such as "second," "third," and the like, are often used to identify or distinguish one element or object from other elements or objects (as in, for example, "first bar"). Unless the specific context requires otherwise, such uses of the term "first," and related similar terms such as "second," "third," and the like, should be construed only as distinguishing identifiers and not construed as indicating any particular order, sequence, chronology, or priority for the corresponding element(s) or object(s). For example, unless the specific context requires otherwise, the term "first bar" simply refers to one particular bar among other bars and does not necessarily require that such one particular bar be positioned ahead of or before any other bar in a sequence of bars; thus, a "first bar" of a musical composition is one particular bar from the musical composition and not necessarily the lead or chronologically-first bar of the musical composition unless otherwise specified.

FIG. 2C is an illustrative diagram showing an instance of method 200 being carried out on the same arbitrary sequence of five (X=5) bars 241, 242, 243, 244, and 245 from FIG. 2B, with an (m, n) value combination of (1, 2) (i.e., m=1 and n=2). In the instance of method 200 depicted in FIG. 2C, bar 242 is the $j^{th}$ bar (i.e., j=2 out of 5). Thus, with m=1 and n=2, the instance of method 200 involves: at 210, a first measure of similarity is determined between bar 242 and bar 241 (because bar 241 constitutes the set of m bars that precede bar 242 when m=1); and at 220, a second measure of similarity is determined between bar 242 and both (either collectively or individually) of bars 243 and 244 (because bars 243 and 244 constitute the set of n bars that succeed bar 242 when n=2). How exactly method 200 proceeds through conditions 202*a*/202*b* and conditional acts 230*a*/230*b* with bar 242 as the $j^{th}$ bar depends, at least in part, on the first and second measures of similarity determined at 210 and 220, respectively. Once bar 242 is assigned to either a first musical segment (per 230*a*) or a second musical segment (per 230*b*) for (m, n)=(1, 2), the instance of method 200 may proceed to re-perform acts 210, 220, 230*a*/230*b* for a different (m, n) value combination (i.e., a different set of m and n values) with bar 242 as the $j^{th}$ bar, but ultimately the instance of method 200 progresses to cast bar 243 as the $j^{th}$ bar.

FIG. 2D is an illustrative diagram showing an instance of method 200 being carried out on the same arbitrary sequence of five (X=5) bars 241, 242, 243, 244, and 245 from FIG. 2B, with an (m, n) value combination of (1, 2) (i.e., m=1 and n=2). In the instance of method 200 depicted in FIG. 2D, bar 243 is the $j^{th}$ bar (i.e., j=3 out of 5). Thus, with m=1 and n=2, the instance of method 200 involves: at 210, a first measure of similarity is determined between bar 243 and bar 242 (because bar 242 constitutes the set of m bars that precede bar 243 when m=1); and at 220, a second measure of similarity is determined between bar 243 and both (either collectively or individually) of bars 244 and 245 (because bars 244 and 245 constitute the set of n bars that succeed bar 243 when n=2). How exactly method 200 proceeds through conditions 202*a*/202*b* and conditional acts 230*a*/230*b* with bar 243 as the $j^{th}$ bar depends, at least in part, on the first and second measures of similarity determined at 210 and 220, respectively. Once bar 243 is assigned to either a first musical segment (per 230*a*) or a second musical segment (per 230*b*) for (m, n)=(1, 2), the instance of method 200 may proceed to re-perform acts 210, 220, 230*a*/230*b* for a different (m, n) value combination with bar 243 as the $j^{th}$ bar, and ultimately the instance of method 200 progresses to cast another bar (e.g., bar 244) as the $j^{th}$ bar.

Throughout this specification and the appended claims, reference is often made to various "measures of similarity" such as a "first measure of similarity" and a "second measure of similarity." A person of skill in the art will appreciate that a wide range of methods and tools may be employed to determine a "measure of similarity" between two or more objects/points of comparison, including methods and/or tools that may indirectly measure similarity by measuring/detecting differences. The various embodiments described herein provide several examples of "measures of similarity" that may be advantageously employed in the present systems, devices, and methods, though a person of skill in the art will appreciate that other measures of similarity not explicitly discussed herein may alternatively or additionally be employed and therefore the present systems, devices, and methods should not be limited to the examples of measures of similarity that are explicitly discussed herein.

Figure 2E:
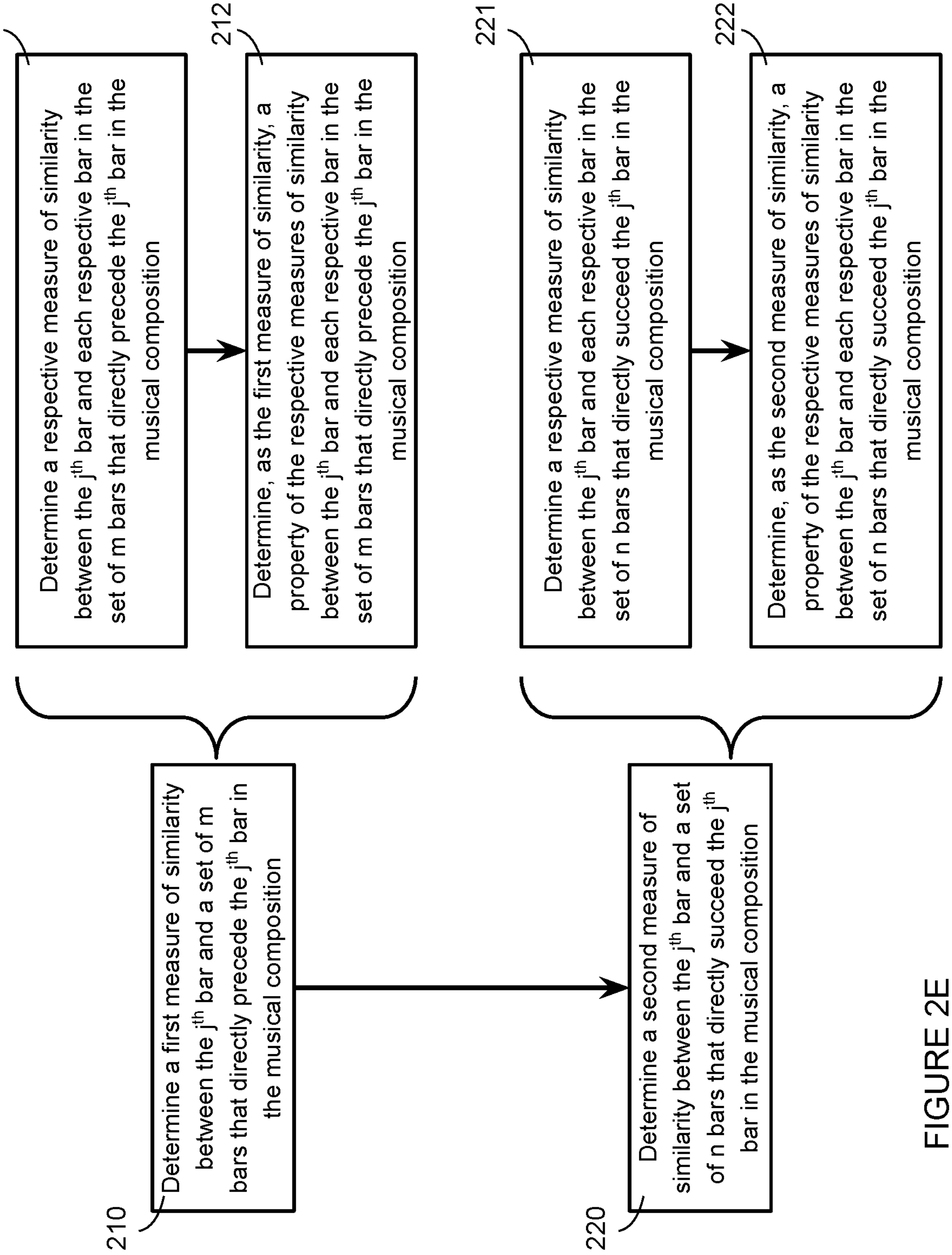
FIG. 2E is a flow diagram showing additional details of an exemplary implementation of certain acts of the computer-implemented method from FIG. 2A, in accordance with the present systems, devices, and methods.

FIG. 2E is a flow diagram showing additional details of an exemplary implementation of acts 210 and 220 of computer-implemented method 200 from FIG. 2A. Specifically, act 210 of method 200 is repeated and shown comprising sub-acts 211 and 212 while act 220 of method 200 is repeated and shown comprising sub-acts 221 and 222.

At 210 from method 200, a first measure of similarity between the $j^{th}$ bar and a set of m bars that directly precede the $j^{th}$ bar in the musical composition is determined. In the exemplary implementation depicted in FIG. 2E, determining the first measure of similarity at 210 comprises sub-act 211 and sub-act 212.

At 211, a respective measure of similarity is determined between the $j^{th}$ bar and each respective bar in the set of m bars that directly precede the $j^{th}$ bar in the musical composition. Returning to FIG. 2B for illustrative example, in the case where bar 243 is the $j^{th}$ bar and m=2, an implementation of sub-act 211 involves determining (e.g., by at least one processor) a measure of similarity between bar 243 and bar 242 and also determining a measure of similarity between bar 243 and bar 241.

At 212, a property of the respective measures of similarity between the $j^{th}$ bar and each respective bar in the set of m bars that directly precede the $j^{th}$ bar in the musical composition is determined (e.g., by at least one processor) as the first measure of similarity referred to in act 210 of method 200. Returning to the example from FIG. 2B above, an implementation of sub-act 212 may involve determining a property of both the measure of similarity determined (at 211) between bar 243 and bar 242 and the measure of similarity determined (at 211) between bar 243 and bar 241.

In a similar way to how sub-acts 211 and 212 depicted in FIG. 2E provide an illustrative example of additional detail for how act 210 of method 200 may, in some implementations, be carried out, sub-acts 221 and 222 provide an illustrative example of additional detail for how act 220 of method 200 may, in some implementations, be carried out.

At 220, a second measure of similarity between the $j^{th}$ bar and a set of n bars that directly succeed the $j^{th}$ bar in the musical composition is determined. In the exemplary implementation depicted in FIG. 2E, determining the second measure of similarity at 220 comprises sub-act 221 and sub-act 222.

At 221, a respective measure of similarity is determined between the $j^{th}$ bar and each respective bar in the set of n bars that directly succeed the $j^{th}$ bar in the musical composition. Returning to FIG. 2B for illustrative example, in the case where bar 243 is the $j^{th}$ bar and n=2, an implementation of sub-act 221 involves determining (e.g., by at least one processor) a measure of similarity between bar 243 and bar 244 and also determining a measure of similarity between bar 243 and bar 245.

At 222, a property of the respective measures of similarity between the $j^{th}$ bar and each respective bar in the set of n bars that directly succeed the $j^{th}$ bar in the musical composition is determined (e.g., by at least one processor) as the second measure of similarity referred to in act 220 of method 200. Returning to the example from FIG. 2B above, an implementation of sub-act 222 may involve determining a property of both the measure of similarity determined (at 221) between bar 243 and bar 244 and the measure of similarity determined (at 221) between bar 243 and bar 245.

The respective measures of similarity determined at 211 and 221, and/or the respective properties of the measures of similarity determined at 212 and 222, may, in some implementations, include distance measures such as correlation distances and/or cosine distances. For example, determining each respective measure of similarity at 211 may include determining a respective correlation distance between the $j^{th}$ bar and each respective bar in the set of m bars that directly precede the $j^{th}$ bar in the musical composition, and determining each respective measure of similarity at 221 may include determining a respective correlation distance between the $j^{th}$ bar and each respective bar in the set of n bars that directly succeed the $j^{th}$ bar in the musical composition. As will be discussed in more detail later on, the distance measures (e.g., correlation distances) may be determined for specific properties, attributes, or formulations of bars.

When the measures of similarity determined at 211 and 221 include distance measures such as correlation distances, the property of the respective measures of similarity that is determined at 212 and/or 222 may include a property (e.g., a minimum or, generally, a mathematical function) of a corresponding set of correlation distances. The minimum of a set of correlation distances is an exemplary measure of similarity advantageously used herein; however, in principle, a set of any form of pairwise distances (including correlation distances, but also including others such as cosine distances) between the $j^{th}$ bar and each of the preceding m bars or succeeding n bars may be constructed at each of 211 and 221, respectively (and in some implementations, measures of similarity that are not true distance measures may be employed). From there, at 212 and 222 an arbitrary function of those pairwise distances may be defined and various different properties of the arbitrary function may be used to produce an overall distance or similarity measure, depending on the specific implementation.

Carrying the example of correlation distances into exemplary musical composition 240 from FIG. 2B, for an (m, n) value combination of (2, 2), at 211 a first correlation distance COR1 may be determined between $j^{th}$ bar 243 and bar 242 and a second correlation distance COR2 may be determined between $j^{th}$ bar 243 and bar 241. At 212, the minimum value min{COR1, COR2} may be determined and returned/used as the "first measure of similarity" described at 210. Similarly, at 221 a third correlation distance COR3 may be determined between $j^{th}$ bar 243 and bar 244 and a fourth correlation distance COR4 may be determined between $j^{th}$ bar 243 and bar 245. At 222, the minimum value min{COR3, COR4} may be determined and returned/used as the "second measure of similarity" described at 220. Continuing through method 200, at 202*a* the minimum value min{COR1, COR2} may be evaluated to see if it satisfies at least a first criterion and at 202*b* the minimum value min{COR3, COR4} may be evaluated to see if it satisfies at least a second criterion. In some implementations, the first criterion and the second criterion may be related. For example, the first criterion may include: "is the minimum determined at 212 (i.e., the first measure of similarity determined at 210) less than the minimum determined at 222 (i.e., the second measure of similarity determined at 220)?" and the second criterion may include: "is the minimum determined at 222 (i.e., the second measure of similarity determined at 220) less than the minimum determined at 212 (i.e., the first measure of similarity determined at 210)?" In the case of this specific example, this would mean that 202*a* checks: "is min{COR1, COR2}<min{COR3, COR4}?" and 202*b* checks: "is min{COR3, COR4}<min{COR1, COR2}?" If the first criterion (is min{COR1, COR2}<min{COR3, COR4}?) checked at 202*a* is true, then the $j^{th}$ bar (e.g., bar 243) is assigned to the first musical segment at 230*a*. If the second criterion (is min{COR3, COR4}<min{COR1, COR2}?) checked at 202*b* is true, then the $j^{th}$ bar (e.g., bar 243) is assigned to the second musical segment at 230*b*.

Generally, conditions 202*a* and 202*b* of method 200 may include a comparison between the first measure of similarity determined at 210 and the second measure of similarity determined at 220. If the $j^{th}$ bar is assessed to be "more similar" to the m bars that precede the $j^{th}$ bar and "less similar" to the n bars that succeed the $j^{th}$ bar, then the "amount of similarity" represented by the first measure of similarity should exceed the "amount of similarity" represented by the second measure of similarity. Likewise if the $j^{th}$ bar is assessed to be "less similar" to the m bars that precede the $j^{th}$ bar and "more similar" to the n bars that succeed the $j^{th}$ bar, then the "amount of similarity" represented by the second measure of similarity should exceed the "amount of similarity" represented by the first measure of similarity. The general term "amount of similarity" is used here because depending on the specific measures being used "higher similarity" may correspond to larger or smaller values. For example, the minimum of a set of pairwise correlation distances used in the example above represents a higher amount of similarity with a lower value, while a person of skill in the art will appreciate that alternative measures of similarity may represent a higher amount of similarity with a higher value.

The criteria evaluated at conditions 202*a* and 202*b* may include one or more thresholds. For example, at 202*a* the first criterion may include a first threshold value that is representative of an amount of correlation between the $j^{th}$ bar and the set of m bars that directly precede the $j^{th}$ bar in the musical composition and at 202*b* the second criterion may include a second threshold value that is representative of an amount of correlation between the $j^{th}$ bar and the set of n bars that directly succeed the $j^{th}$ bar in the musical composition. As described above, in some implementations the first threshold value may include or invoke the second measure of similarity and the second threshold value may include or invoke the first measure of similarity (in this case, whether or not being greater than or less than the first/second threshold causes the first/second criterion to be satisfied depends on the nature of the first/second measure of similarity; e.g., for a first measure of similarity represented by a value that is inversely proportional to the amount of similarity (such as the minimum of correlation distances), the first criterion may be satisfied when the first measure of similarity is less than the second measure of similarity). Furthermore, in some implementations either or both of the first threshold value and/or the second threshold value may include some additional buffer amount. That is, in some implementations the first criterion may be satisfied only when the first measure of similarity is less than "the second measure of similarity minus X" (or greater than "the second measure of similarity plus X," if similarity is directly proportional to the value of the measure of similarity) and/or the second criterion may be satisfied only when the second measure of similarity is less than "the first measure of similarity minus Y" (or greater than "the first measure of similarity plus Y," if similarity is directly proportional to the value of the measure of similarity). Some implementations of the present systems, devices, and methods may include iterating over multiple different threshold values and combining or otherwise synthesizing the results to provide deeper insight into potential segmentations and ultimately improve the quality of the final segmentation used or accepted. For example, method 200 may be carried out using a first threshold value in either or both of conditions 202*a*/202*b*, then repeated using a second threshold value in either or both of conditions 202*a*/202*b* (the second threshold value different from the first threshold value), then repeated using a third threshold value in either or both of conditions 202*a*/202*b* (the third threshold value different from both the first threshold value and the second threshold value, and on and on for any number of iterations using any number of different threshold values depending on the specific implementation. The results of various iterations using different threshold values may be averaged (with or without weightings) or otherwise processed to produce a collective result for the segmentation of the musical composition.

Some implementations of the present systems, devices, and methods may include iterating over both: i) (m, n) value combinations, and ii) threshold values. That is, for any given (m, n) value combination multiple iterations may be performed each with a different threshold value, and/or for any given threshold value multiple iterations may be performed each with a different (m, n) value combination. Thus, in some implementations the present systems, devices, and methods may be highly iterative and explore a large number of permutations. The averaging of such a large number of results can advantageously enhance the quality of the segmentation of the musical composition provided as an end result.

For the purposes of segmentation, conditions 202*a*/202*b* and conditional acts 230*a*/230*b* of method 200 may, in some implementations, generally perform the following function:

- if the $j^{th}$ bar is more similar to the m bars that directly precede the $j^{th}$ bar and less similar to the n bars that directly succeed the $j^{th}$ bar, then assign the $j^{th}$ bar to a first musical segment that is a same musical segment as the m bars that directly precede the $j^{th}$ bar;
- if the $j^{th}$ bar is less similar to the m bars that directly precede the $j^{th}$ bar and more similar to the n bars that directly succeed the $j^{th}$ bar, then assign the $j^{th}$ bar to a second musical segment that is a same musical segment as the n bars that directly succeed the $j^{th}$ bar.

However, in implementations that impose an additional buffer amount on the first/second threshold as part of the first/second criterion, the buffer amount introduces an extra amount by which the $j^{th}$ bar must be more similar to the m/n bars that precede/succeed the $j^{th}$ bar in order for the $j^{th}$ bar to be assigned to the first/second musical segment.

A person of skill in the art will appreciate, in view of this disclosure, that the present systems, devices, and methods may employ a wide range of different principles, techniques, and/or formulations in the "measures of similarity" between bars in a musical composition. Different measures of similarity may be more or less suitable depending on the specific implementation. The present systems, devices, and methods are not intended to be limited to any one form of "measures of similarity," but nevertheless some examples of measures of similarity that can be particularly advantageous are described.

As described previously, distance measures are examples of measures of similarity that may be employed in the present systems, devices, and methods, but even within the concept of distance measures there is a wide variety of different "distances" that can be measured. As a first example, some implementations may employ a concept referred to herein as the "energy per bar per track" (or, interchangeably, "energy per track per bar") as the property that characterizes individual bars and the property between which distances may be measured. Energy per bar per track is just one of many different properties that may be used to provide a fingerprint of a bar and form the basis of comparisons (or measures of similarity) between bars.

Throughout this specification and the appended claims, reference is often made to a "track." Unless the specific context requires otherwise, the term track is used herein to refer to a collection or sequence of notes that are all "played by" the same instrument in a musical composition. For example, a musical composition that is for or by a single instrument may have only one track, but a musical composition that is for or by multiple instruments concurrently may have multiple tracks that are temporally overlaid on one another. Each respective bar of a musical composition may include multiple tracks, where each track provides the sequence of notes of a respective instrument throughout the duration of that bar. From an alternative but equally valid perspective, each respective track of a musical instrument may include multiple bars.

In accordance with the present systems, devices, and methods, energy per bar per track may be defined as the sum of the products of note duration times note volume for all notes in a given track in a given bar. In other words, energy per bar per track is determined by determining a respective product of note duration multiplied by note volume for each respective note in each respective track of a bar (or, interchangeably, for each respective note in each respective bar in a track) and then determining a sum of these respective products. For example, if a bar includes a first track that includes two notes N1, N2 and a second track that includes one note N3, the "energy" of the first track E1 may be determined as:

$$E1=\text{duration}(N1)*\text{volume}(N1)+\text{duration}(N2)*\text{volume}(N2)$$

and the "energy" of the second track E2 may be determined as:

$$E2=\text{duration}(N3)*\text{volume}(N3).$$

Thus, for any given bar a column vector may be constructed whose rows index, correspond to, or otherwise represent tracks and whose entries are "energy per bar per track." The resulting column vector may be expanded into a matrix to encompass a series of bars—e.g., to encompass the m/n bars that directly precede/succeed a $j^{th}$ bar in a musical composition. Returning to FIG. 2E, in some implementations act 211 may include constructing a matrix of "energy per bar per track" in which the rows index tracks, there are m columns that index the m bars that directly precede the $j^{th}$ bar in the musical composition, and the entries are "energy per bar per track." Similarly, in some implementations act 221 may include constructing a matrix of "energy per bar per track" in which the rows index tracks, there are n columns that index the n bars that directly succeed the $j^{th}$ bar in the musical composition, and the entries are "energy per bar per track."

In some implementations, the distance measures described herein are pairwise distance measures. That is, determining a respective measure of similarity between a $j^{th}$ bar and each of the m bars that directly precede the $j^{th}$ bar at 211 (or each of the n bars that directly succeed the $j^{th}$ bar at 221) may include determining respective pairwise distances between the $j^{th}$ bar and each of the m bars that directly precede the $j^{th}$ bar (or each of the n bars that directly succeed the $j^{th}$ bar). Generally, it may be advantageous to include all tracks when determining a distance between a pair of bars, and therefore determining a distance between two bars may, in accordance with the present systems, devices, and methods, include determining a distance between two column vectors: a first column vector u that represents the $j^{th}$ bar with each row in the column vector corresponding to a respective track and each entry in the column vector corresponding to a respective "energy per bar per track" value; and a second column vector v that represents one of the m/n bars that precedes/succeeds the $j^{th}$ bar for which the measure of similarity is being determined, and in which similarly each row corresponds to a respective track and each entry corresponds to a respective "energy per bar per track" value. If the distance measure being used is a correlation distance, then the correlation distance between u and v may be determined as:

$$CorrDis[u, v] = 1 - \left(\frac{(u - \text{mean }[u])\cdot(v - \text{mean }[v])}{Norm\ [u - \text{mean }[u]]\cdot Norm\ [v - \text{mean }[v]]}\right)$$

Though as previously described, a person of skill in the art will appreciate that a wide variety of other measures may be used, including distance measures and measures that do not necessarily satisfy all the criteria of distance measures.

The "energy per bar per track" metric described above may typically be most suitable when there are multiple different instruments (and, in some cases, tracks) involved in the musical composition being segmented. However, energy per bar per track can be less suitable for use when a musical composition has only one instrument (and/or, for example, only one track). Thus, the present systems, devices, and methods describe another "measure of similarity" that may be more suitable for use with musical compositions that employ only one or a relatively small number of instruments and/or tracks. This additional measure of similarity is referred to herein as the "octaveless parallel note sequence per bar per track" (or, interchangeably, "octaveless parallel note sequence per track per bar").

"Octaveless parallel note sequence per bar per track" may be defined as the vector of time-ordered groups of simultaneously starting notes, without regard to octave, in a given bar in a given track. An exemplary process to compute each such object for each bar of each track is:

I. group the notes for each bar into those that start simultaneously in increasing order of their start times;
II. within each group, order the notes by increasing pitch. A convention may be adopted to deal with enharmonic equivalents (e.g., C# and Db) within each group, such as placing the sharps before the flats (or alternatively, placing the flats before the sharps).

This produces the "parallel note sequence per bar per track;" however, since the segmentation approaches described herein may involve detecting shifts in tonality, the above can be further simplified by disregarding the octave values for every note (i.e., by making each note "octaveless"). In other words, determining "octaveless parallel note sequence per bar per track" may include, for each track of each bar, sorting all notes by note start time and, for each note start time, sorting all corresponding notes by note pitch, wherein sorting all corresponding notes by note pitch includes ignoring octave information for each note (so, for example, A2 and A4 both correspond to "A" and are grouped together accordingly). When this computation is repeated for each bar of each track, the results may be assembled into a tensor whose rows index consecutive tracks, whose columns index consecutive bars, and whose entries are "octaveless parallel note sequence per bar per track."

Returning to method 200 and FIG. 2A, at 201 it is specified that acts 210 and 220 and (either of) conditional acts 230*a*/230*b* are all carried out for at least one (m, n) value combination where m, n≥0. In some implementations, carrying out method 200 for a single (m, n) value combination may be sufficient to determine an acceptable segmentation of a musical composition; however, in other implementations it can be advantageous to carry out method 200 for multiple different (m, n) value combinations and to use the results thereof to determine an improved (e.g., more accurate, more reliable, more suitable, and/or more refined) segmentation of the musical composition. An example of how the result of method 200 may be further refined with additional iterations employing different (m, n) value combinations is provided in FIG. 2F.

Figure 2F:
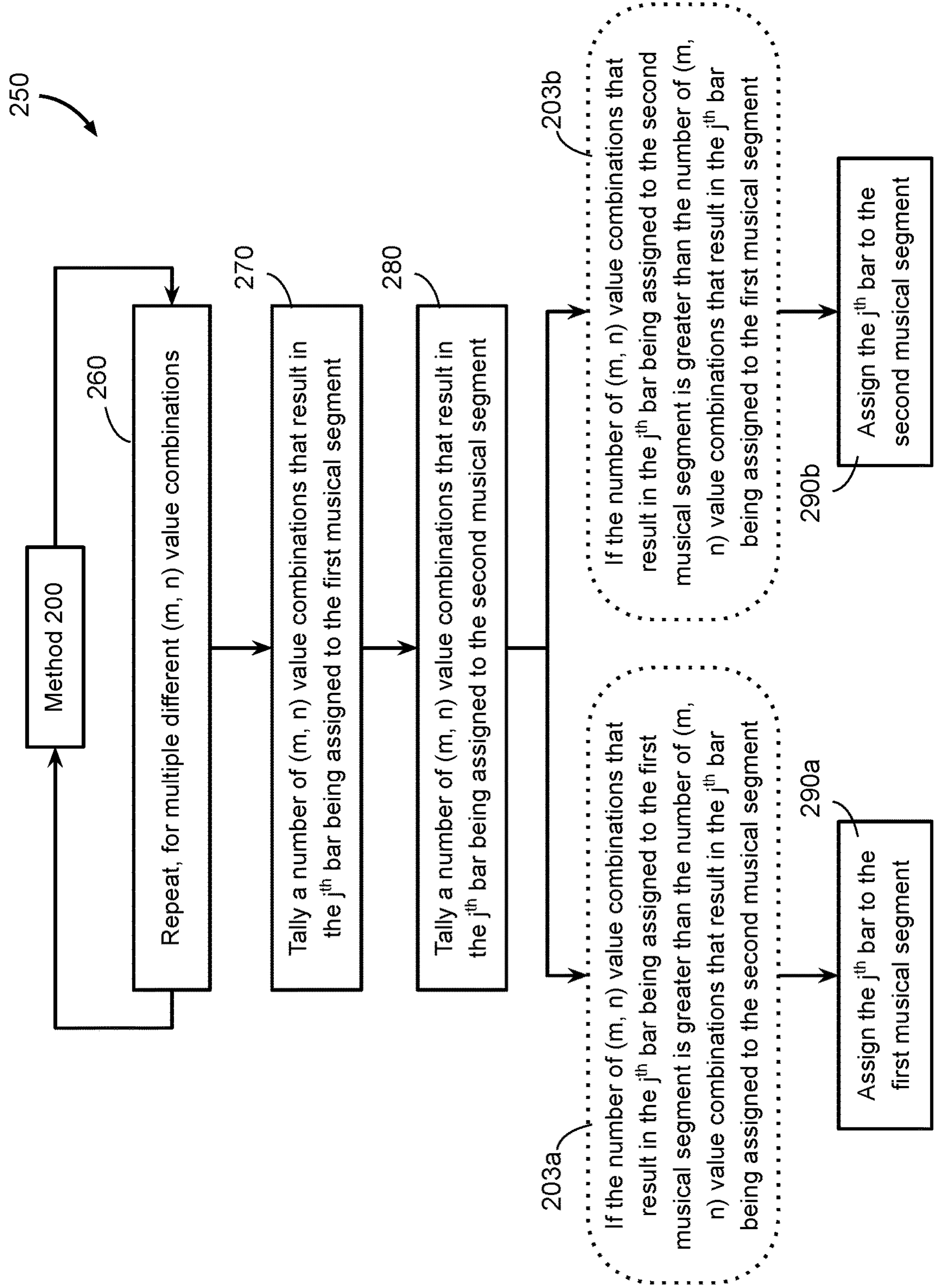
FIG. 2F is a flow diagram showing an exemplary computer-implemented method of segmenting a musical composition into musical segments in accordance with the present systems, devices, and methods.

FIG. 2F is a flow diagram showing an exemplary computer-implemented method 250 of segmenting a musical composition into musical segments in accordance with the present systems, devices, and methods. Method 250 is an extension of method 200 and, unless the specific context requires otherwise, includes all of the acts and details of FIG. 2A described previously.

Method 250 begins at 260 where method 200 is repeated for multiple different (m, n) value combinations. That is, at 260 all of the following are repeated for multiple (m, n) value combinations: determining a first measure of similarity between the $j^{th}$ bar and a set of m bars that directly precede the $j^{th}$ bar in the musical composition per 210; determining a second measure of similarity between the $j^{th}$ bar and a set of n bars that directly succeed the $j^{th}$ bar in the musical composition per 220; and either assigning the $j^{th}$ bar to a first musical segment per 230*a* or assigning the $j^{th}$ bar to a second musical segment per 230*b*, depending on how the first and second measures of similarity compare to the first criterion 202*a* and the second criterion 202*b*, respectively. Either or both of the m value and/or the n value may change in the various iterations of method 200 at 260. For example, at 260: a first iteration of method 200 may be performed using an $(m_1, n_1)$ value combination, a second iteration of method 200 may be performed using an $(m_1, n_2)$ value combination, a third iteration of method 200 may be performed using an $(m_2, n_1)$ value combination, a fourth iteration of method 200 may be performed using an $(m_2, n_2)$ value combination, and so on for however many different (m, n) value combinations are called for in the specific implementation.

Each instance or iteration of method 200 performed at 260 includes a respective instance or iteration of conditional act 230*a* or conditional act 230*b* depending on how the first and second measures of similarity compare to the first criterion 202*a* and the second criterion 202*b*, respectively. Therefore, each instance or iteration of method 200 performed at 260 results in the $j^{th}$ bar being assigned to a first musical segment at 230*a* or a second musical segment at 230*b*. Once all of the iterations of method 200 are completed at 260 (the exact number depending on the specific implementation and the number of unique (m, n) value combinations explored), method 250 proceeds to acts 270 and 280.

At 270, a number of (m, n) value combinations that result in the $j^{th}$ bar being assigned to the first musical segment at 260 is tallied, e.g., by at least one computer processor. At 280, a number of (m, n) value combinations that result in the $j^{th}$ bar being assigned to the second musical segment at 260 is tallied, e.g., by at least one computer processor. As an example, if at 260 N iterations of method 200 are completed each with a respective one of N different (m, n) value combinations (where N is an integer greater than 1), then at 270 the number P of those N (m, n) value combinations that result in the $j^{th}$ bar being assigned (each at a respective instance of conditional act 230*a*) to the first musical segment is tallied while at 280 the number Q of those N (m, n) value combinations that result in the $j^{th}$ bar being assigned (each at a respective instance of conditional act 230*b*) to the second musical segment is tallied. In some implementations, P+Q=N so if, for example, N=10 iterations of method 200 are completed at 260 each with a respective one of N=10 different (m, n) value combinations, then at 270 P might be 4 and at 280 Q might be 6.

Throughout this specification and the appended claims, various methods are described as including one or more "tallying" act(s) to aggregate the results of multiple iterations (such as, for example, acts 270 and 280 of method 250). Unless the specific context requires otherwise, such tallying acts are intended as illustrative examples of the results of multiple iterations may be aggregated and, in accordance with the present systems, devices, and methods, alternative implementations of the various methods described herein may employ alternative approaches to aggregate the results of multiple iterations other than tallying, including for example developing a family of classifiers for deciding to which segment a bar should be assigned and aggregating the family of classifiers using a random forest technique.

Analogous to conditions 202*a*/202*b* and conditional acts 230*a*/230*b* of method 200, method 250 further includes conditions 203*a* and 203*b* and conditional acts 290*a* and 290*b*. Generally, conditions 203*a* and 203*b* check, assess, evaluate, and/or compare the number P of (m, n) value combinations that result in the $j^{th}$ bar being assigned to the first musical segment as tallied at 270 and the number Q of (m, n) value combinations that result in the $j^{th}$ bar being assigned to the second musical segment as tallied at 280, respectively. If condition 203*a* is satisfied then conditional act 290*a* is triggered, whereas if condition 203*b* is satisfied then conditional act 290*b* is triggered. Conditions 203*a* and 203*b* may advantageously be structured such that only one of condition 203*a* or condition 203*b* can be satisfied for any given $j^{th}$ bar. For example, conditions 203*a* and 203*b* may be formulated relative to one another, such as: "if P>Q" and "if P<Q," respectively (the scenario where P=Q is addressed later on).

As a specific example, condition 203*a* may check if the number P of (m, n) value combinations that result in the $j^{th}$ bar being assigned to the first musical segment is greater than the number Q of (m, n) value combinations that result in the $j^{th}$ bar being assigned to the second musical segment. If condition 203*a* is satisfied (i.e., if P>Q), then method 250 may proceed to act 290*a* at which the $j^{th}$ bar is definitively assigned to the first musical segment. Similarly, condition 203*b* may check if the number Q of (m, n) value combinations that result in the $j^{th}$ bar being assigned to the second musical segment is greater than the number P of (m, n) value combinations that result in the $j^{th}$ bar being assigned to the first musical segment. If condition 203*b* is satisfied (i.e., if Q>P), then method 250 may proceed to act 290*b* at which the $j^{th}$ bar is definitively assigned to the second musical segment.

Although not typical, in some implementations neither condition 203*a* nor condition 203*b* may be satisfied. An example of such a situation is when the number P of (m, n) value combinations that result in the $j^{th}$ bar being assigned to the first musical segment is equal to the number Q of (m, n) value combinations that result in the $j^{th}$ bar being assigned to the second musical segment (i.e., P=Q). If this occurs, the $j^{th}$ bar in question may have a similar quality of fit in (or a similar amount of similarity to) the first musical segment and the second musical segment. In some implementations, either condition 203*a* or condition 203*b* may be adapted to include the situation where the number P of (m, n) value combinations that result in the $j^{th}$ bar being assigned to the first musical segment is equal to the number Q of (m, n) value combinations that result in the $j^{th}$ bar being assigned to the second musical segment. For example, condition 203*a* may be adapted to check if the number P of (m, n) value combinations that result in the $j^{th}$ bar being assigned to the first musical segment is greater than or equal to the number Q of (m, n) value combinations that result in the $j^{th}$ bar being assigned to the second musical segment (i.e., P≥Q), or condition 203*b* may be adapted to check if the number Q of (m, n) value combinations that result in the $j^{th}$ bar being assigned to the second musical segment is greater than or equal to the number P of (m, n) value combinations that result in the $j^{th}$ bar being assigned to the first musical segment (i.e., P≤Q). In other implementations, a third condition may be included that checks if the number P of (m, n) value combinations that result in the $j^{th}$ bar being assigned to the first musical segment is equal to the number Q of (m, n) value combinations that result in the $j^{th}$ bar being assigned to the second musical segment. If the third condition is satisfied (i.e., if P=Q), then method 250 may proceed to either conditional act 290*a*, conditional act 290*b*, or to a third conditional act that addresses this situation in a particular way (e.g., assign the $j^{th}$ bar to a same musical segment as the musical segment to which the $(j-1)^{th}$ bar or the $(j+1)^{th}$ bar is assigned) depending on the specific implementation.

As previously described, in some implementations of the present systems, devices, and methods a musical composition may be segmented using a single (m, n) value combination, while in other implementations a musical composition may be segmented using multiple different (m, n) value combinations. Using multiple different (m, n) value combinations (e.g., (1,1), (2,2), . . . (8,8), etc.) can, in some implementations, advantageously provide a more sophisticated and reliable segmentation than using a single (m, n) value combination; however, a person of skill in the art will appreciate that the number of different (m, n) value combinations available, and so the number of different (m, n) value combinations actually implemented, may vary from $j^{th}$ bar to $j^{th}$ bar and may depend, for example, on the relative position of the $j^{th}$ bar in the musical composition. For example, the initial bar (i.e., the $j^{th}$ bar for which j=1) necessarily has m=0 because there are no bars that directly precede the j=1 bar, the j=2 bar necessarily has m=1 because there is only one bar (i.e., the j=1 bar) that directly precedes the j=2 bar, the j=3 bar may use m={1, 2}, the j=4 bar may use m={1, 2, 3}, and so on. Likewise, the final bar (i.e., the $j^{th}$ bar for which j=X, where X is the total number of bars in the musical composition) necessarily has n=0 because there are no bars that directly succeed the j=X bar, the j=(X−1) bar necessarily has n=1 because there is only one bar (i.e., the j=X bar) that directly succeeds the j=(X−1) bar, the j=(X−2) bar may use n={1, 2}, the j=(X−3) bar may use n={1, 2, 3}, and so on.

Generally, some implementations of the systems, devices, and methods for segmenting musical compositions described herein may involve assessing whether each $j^{th}$ bar is more similar to the m bars that directly precede it or the n bars that directly succeed it in the musical composition. If the $j^{th}$ bar is more similar to the m bars that directly precede it then the $j^{th}$ bar may be grouped with, or assigned to the same musical segment as, the m bars that directly precede it (or at least, the same musical segment as the $(j-1)^{th}$ bar that directly precedes the $j^{th}$ bar), whereas if the $j^{th}$ bar is more similar to the n bars that directly succeed it then the $j^{th}$ bar may be grouped with, or assigned to the same musical segment as the n bars that directly succeed it (or at least, the same musical segment as the $(j+1)^{th}$ bar that directly succeeds the $j^{th}$ bar). In this way, boundaries between adjacent segments may be identified, with the bar on a first side of the boundary belonging or assigned to a first musical segment and the bar on a second side of the boundary belonging or assigned to a second musical segment. The concept of identifying boundaries between musical segments is exemplified in method 300 illustrated in FIG. 3A.

Figure 3A:
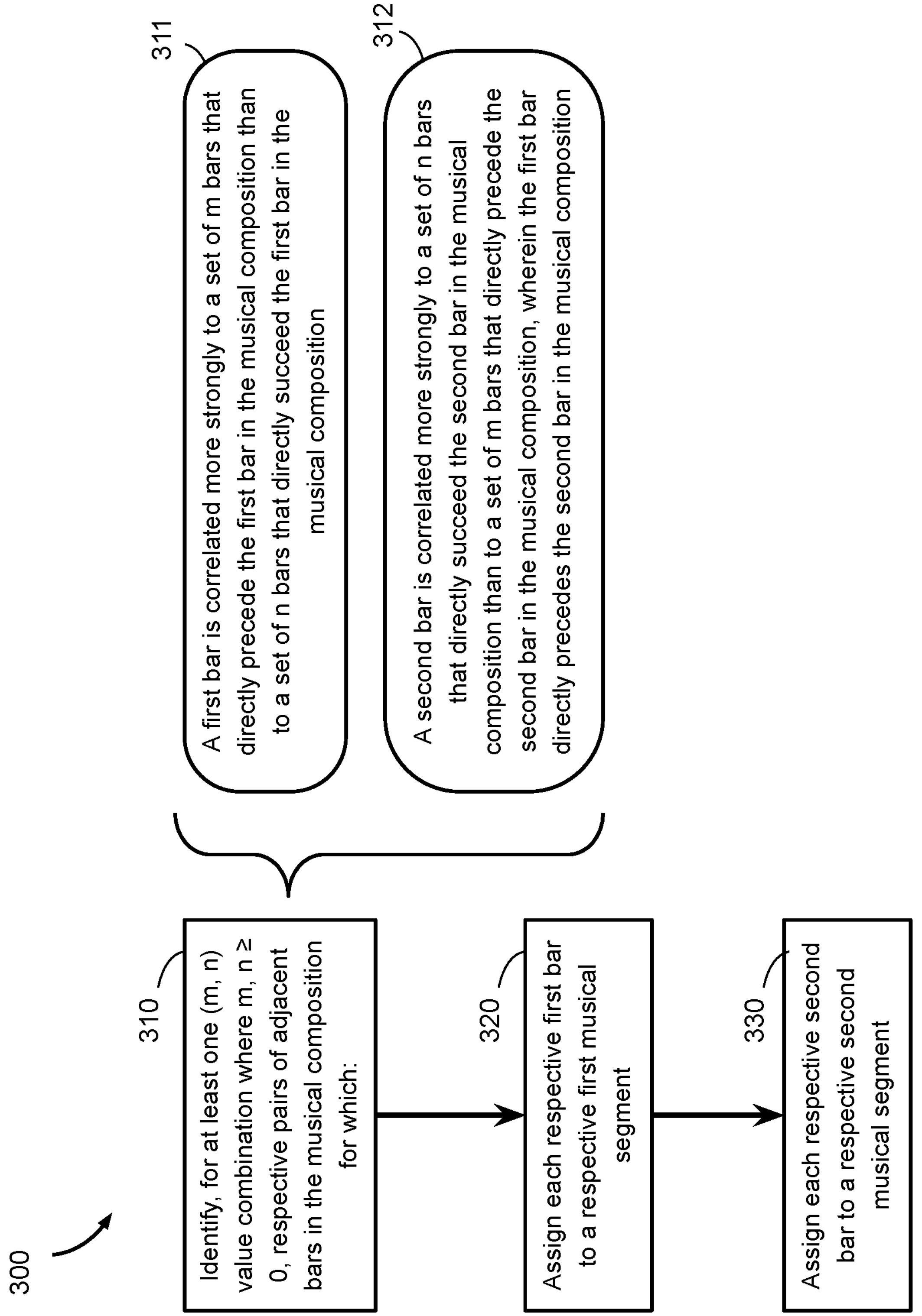
FIG. 3A is a flow diagram showing an exemplary computer-implemented method of segmenting a musical composition into musical segments in accordance with the present systems, devices, and methods.

FIG. 3A is a flow diagram showing an exemplary computer-implemented method 300 of segmenting a musical composition into musical segments in accordance with the present systems, devices, and methods. The musical composition being segmented by method 300 comprises a sequence of bars such as, for example, musical composition 100 from FIG. 1. Method 300 includes three acts 310, 320, and 330 and two conditions are criteria 311, 312 that are assessed or enforced in relation to act 310. Those of skill in the art will appreciate that in alternative implementations certain acts and/or criteria may be omitted and/or additional acts and/or criteria may be added. Those of skill in the art will also appreciate that the illustrated order of the acts and/or criteria is shown for exemplary purposes only and may change in alternative implementations. Many features and elements of method 300 or similar to those described for method 200 and descriptions thereof are not repeated at length or in depth in the context of method 300. A person of skill in the art will appreciate how related features and elements of method 200 may be applied, or adapted to be applied, in method 300 and vice versa.

At 310, respective pairs of adjacent bars in the musical composition are identified (e.g., by at least one computer processor) for which criteria 311 and 312 are both satisfied for at least one (m, n) value combination where m, n≥0. Criteria 311 and 312 may be generally structured such that a first bar in a pair of adjacent bars may satisfy criterion 311 and a second bar in the pair of adjacent bars may satisfy criterion 312. In the illustrated example of method 300 shown in FIG. 3A, criterion 311 checks, assesses, evaluates, imposes, or enforces that a first bar in a pair of adjacent bars is correlated more strongly to a set of m bars that directly precede the first bar in the musical composition than to a set of n bars that directly succeed the first bar in the musical composition, while criterion 312 checks, assesses, evaluates, imposes, or enforces that a second bar in the pair of adjacent bars is correlated more strongly to a set of n bars that directly succeed the second bar in the musical composition than to a set of m bars that directly precede the second bar in the musical composition. In a pair of adjacent bars, the first bar directly precedes the second bar in the musical composition and the second bar directly succeeds the first bar in the musical composition.

At 320, each respective first bar in a respective pair of adjacent bars identified at 310 is assigned (e.g., by at least one processor) to a respective first musical segment. At 330, each respective second bar in a respective pair of adjacent bars identified at 310 is assigned (e.g., by at least one processor) to a respective second musical segment. In other words, for each respective pair of adjacent bars identified at 310, the first bar and the second bar are each assigned (at 320 and 330, respectively) to different respective musical segments. This means that, in some implementations of method 300, each respective pair of adjacent bars identified at 310 may characterize a respective boundary in between a respective pair of adjacent musical segments in the musical composition, with each respective boundary located or positioned in between a respective first bar and a respective second bar in a respective pair of adjacent bars identified at 310. If the musical segments on either side of a boundary (i.e., if the first musical segment from 320 and the second musical segment from 330) each comprise more than one bar, then at 320 each respective first bar may be assigned to a same musical segment as a bar that directly precedes the first bar in the musical composition and at 330 each respective second bar may be assigned to a same musical segment as a bar that directly succeeds the second bar in the musical composition.

As a simple example, an illustrative musical composition may comprise a sequence of 30 bars structured as follows: a 4-bar intro, followed by a 5-bar verse, followed by a 5-bar chorus, followed by a 5-bar verse, followed by a 5-bar chorus, followed by a 6-bar outro. In an implementation of method 300 for this illustrative musical composition, five respective pairs of adjacent bars may be identified at 310, namely: b4:b5, b9:b10, b14:b15, b19:b20, and b24:b25, where the notation bi generally denotes the $i^{th}$ bar in the musical composition. In an implementation of act 320 for this illustrative musical composition, b4 may be assigned to the intro, b9 may be assigned to the first verse, b14 may be assigned to the first chorus, b19 may be assigned to the second verse, and b24 may be assigned to the second chorus. In an implementation of act 330 for this illustrative musical composition, b5 may be assigned to the first verse, b10 may be assigned to the first chorus, b15 may be assigned to the second verse, b20 may be assigned to the second chorus, and b25 may be assigned to the outro. Thus, a first boundary may be characterized between b4:b5, the first boundary corresponding to a transition between the intro and the first verse; a second boundary may be characterized between b9:b10, the second boundary corresponding to a transition between the first verse and the first chorus; a third boundary may be characterized between b14:b15, the third boundary corresponding to a transition between the first chorus and the second verse; a fourth boundary may be characterized between b19:b20, the fourth boundary corresponding to a transition between the second verse and the second chorus; and a fifth boundary may be characterized between b24:b25, the fifth boundary corresponding to a transition between the second chorus and the outro of the musical composition.

Figure 3B:
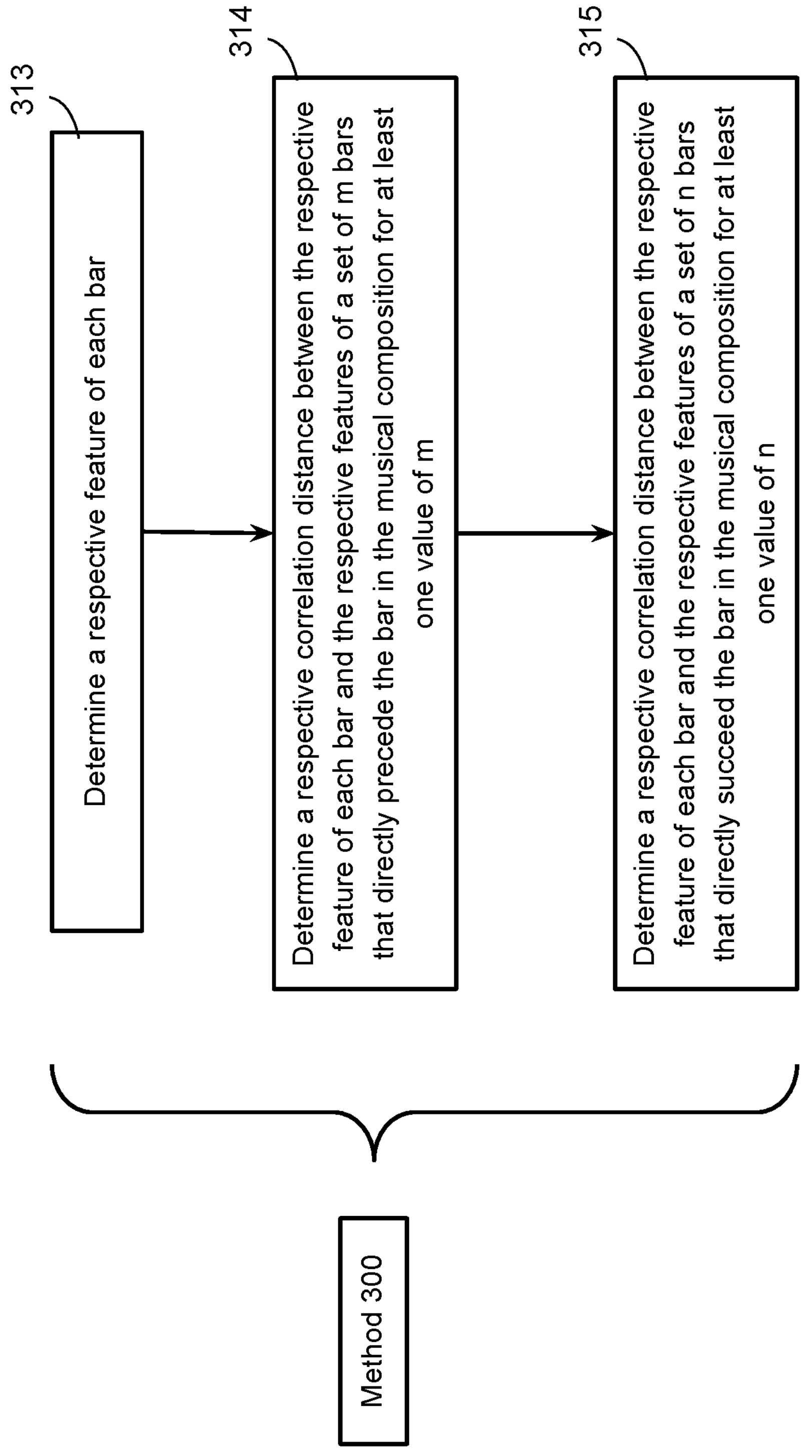
FIG. 3B is a flow-diagram showing further details of additional acts that may be performed in some implementations of the method from FIG. 3A, in accordance with the present systems, devices, and methods.

FIG. 3B is a flow-diagram showing further details of additional acts that may be performed in some implementations of method 300 from FIG. 3A. Specifically, FIG. 3B illustrates that method 300 may, in some implementations, further include acts 313, 314, and 315. A person of skill in the art will appreciate that the illustrated order of acts 313, 314, and 315 may vary in different implementations, and that in some implementations certain acts may be omitted and/or additional acts may be included. Acts 313, 314, and 315 may be performed before act 310 of method 300, in parallel with act 310 of method 300, or as part of act 310 of method 300.

At 313, at least one respective feature of each bar in the musical composition is determined, e.g., by at least one computer processor. The exact form or nature of the feature(s) determined at 313 may depend on the specific implementation, but in general may include any characteristic or property of a musical bar that can be measured, calculated, or determined and used as a fingerprint to characterize at least some aspect(s) of the bar. This includes, but is not limited to, "energy per bar per track" and/or "octave-less parallel note sequence per bar per track" as described previously.

At 314, a respective distance measure (e.g., correlation distance) is determined (e.g., by at least one processor) between the respective feature (determined at 313) of each bar and the respective features (also determined at 313) of a set of m bars that directly precede the bar in the musical composition for at least one value of m. Determining a distance measure may be completed substantially similarly to as described in relation to methods 200 and 250.

At 315, a respective distance measure (e.g., correlation distance) is determined (e.g., by at least one processor) between the respective feature (determined at 313) of each bar and the respective features (also determined at 313) of a set of n bars that directly succeed the bar in the musical composition for at least one value of n. As is the case for 314, determining distance measures at 315 may be completed substantially similarly to as described previously in relation to methods 200 and 250.

Thus, a result of additional acts 313, 314, and 315 is that pairwise distance measures (e.g., correlation distances) are determined, in relation to at least one feature, between each bar in the musical composition and m bars that precede the bar (for at least one value of m) and n bars that succeed the bar (for at least one value of n). Using this information (either after it is determined or while it is in the process of being determined), the respective pairs of bars satisfying criteria 311 and 312 may be identified at act 310 of method 300.

In a similar way to that described for methods 200 and 250, one or more portion(s) of method 300 may advantageously be repeated or iterated for any number of (m, n) value combinations in order to produce more complete and/or statistically-supported segmentation results. In some implementations, the entirety of method 300 may be repeated or iterated, whereas in other implementations only a portion, such as act 310, of method 300 may be repeated or iterated and then acts 320 and 330 may be adapted to accommodate the results of iterating 310.

Figure 3C:
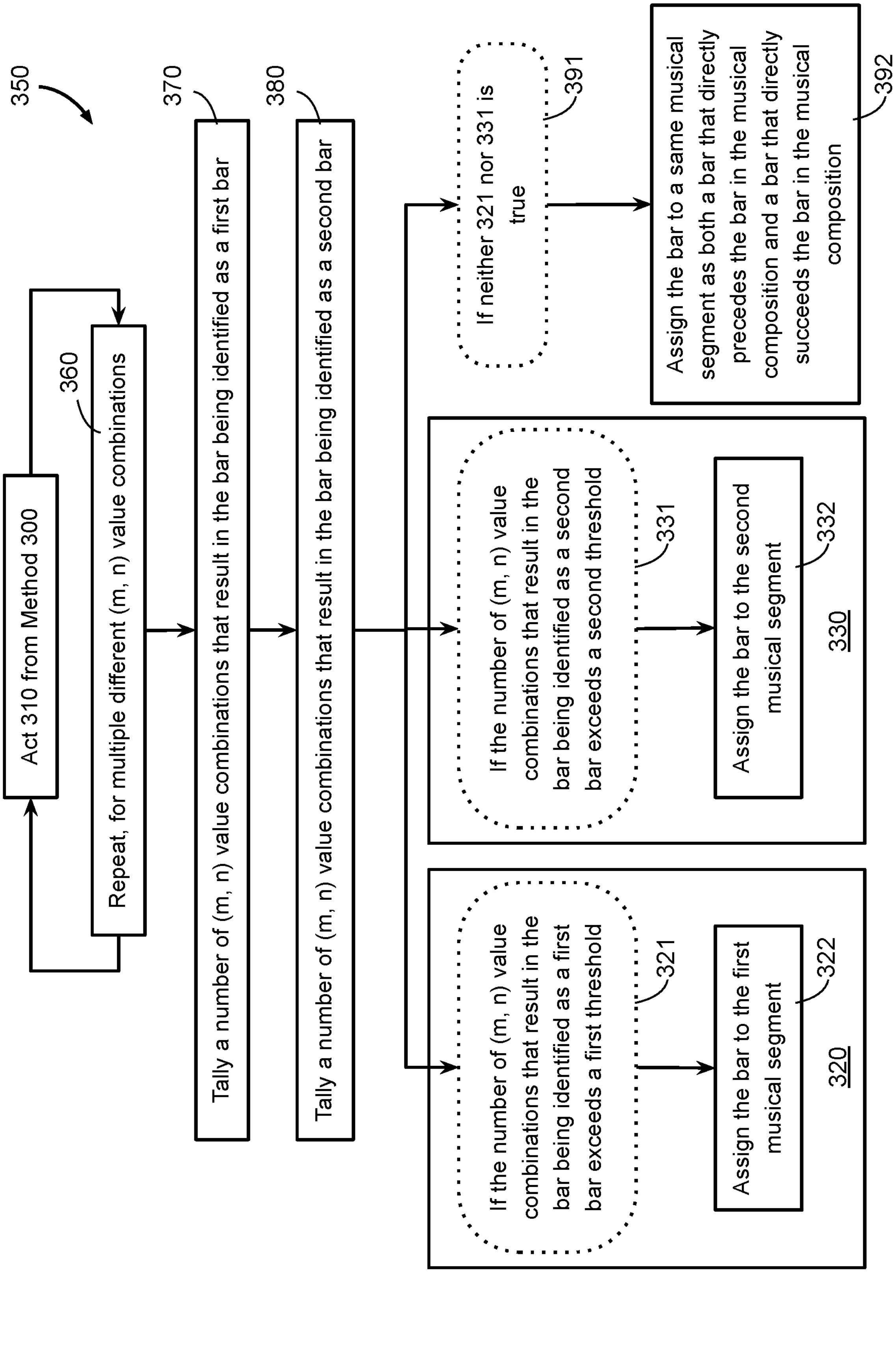
FIG. 3C is a flow diagram showing an exemplary computer-implemented method of segmenting a musical composition into musical segments in accordance with the present systems, devices, and methods.

FIG. 3C is a flow diagram showing an exemplary computer-implemented method 350 of segmenting a musical composition into musical segments in accordance with the present systems, devices, and methods. Method 350 is an extension of method 300 and, unless the specific context requires otherwise, includes all of the acts and details of FIG. 3A (and in some implementations, FIG. 3B) described previously.

Method 350 begins at 360 where act 310 of method 300 is repeated for multiple different (m, n) value combinations. That is, at 360 the identifying respective pairs of adjacent bars in the musical composition for which criteria 311 and 312 are satisfied is repeated for multiple different (m, n)

value combinations. The number of different (m, n) value combinations may vary from bar to bar and/or from implementation to implementation as previously described.

At 370, for each bar a number of (m, n) value combinations that result in the bar being identified as a first bar at 360 is tallied, e.g., by at least one computer processor. At 380, for each bar a number of (m, n) value combinations that result in the bar being identified as a second bar is tallied, e.g., by at least one computer processor. As an example, if at 360 N iterations of act 310 are completed, each with a respective one of N different (m, n) value combinations (where N is an integer greater than 1), then for each bar: at 370 the number P of those N different (m, n) value combinations that result in the bar satisfying criterion 311 (i.e., being identified as a first bar) is tallied while at 380 the number Q of those N different (m, n) value combinations that result in the bar satisfying criterion 312 (i.e., being identified as a second bar) is tallied. In some implementations, P+Q=N, so if, for example, N=10 iterations of act 310 are completed at 360, each with a respective one of N=10 different (m, n) value combinations, then at 370 P might be 2 and at 380 Q might be 8. However, as will be discussed in more detail later on, in some implementations P+Q may be less than N.

In addition to extending method 300 with additional acts 360, 370, and 380, method 350 also adds further details to acts 320 and 330 of method 300 to accommodate the multiple iterations of act 310 completed at act 360 of method 350. Specifically, act 320 from method 300 comprises condition 321 and act 322 in method 350, and act 330 from method 300 comprises condition 331 and act 332 in method 350. In some implementations, the additional features of method 350 (relative to method 300) also include condition 391 and act 392.

At 320 of method 300, each respective first bar is assigned to a respective first musical segment. Taking into account the multiple iterations of act 310 performed at 360, method 350 provides condition 321 which, for each bar, checks, assesses, evaluates, or otherwise determines if the number of (m, n) value combinations that result in the bar being identified as a first bar exceeds a first threshold. If condition 321 is satisfied then method 350 proceeds to act 322 at which the bar in question is assigned to the first musical segment. In this way, the combination of condition 321 and act 322 in method 350 completes act 320 of method 300 for bars that satisfy condition 321. As previously described, some implementations that employ thresholds may further include multiple iterations with various iterations each employing a different threshold. The results using different thresholds may be combined and synthesized (e.g., summed or averaged, with or without weightings) to improve the quality and/or robustness of a segmentation.

At 330 of method 300, each respective second bar is assigned to a respective second musical segment. Taking into account the multiple iterations of act 310 performed at 360, method 350 provides condition 331 which, for each bar, checks, assesses, evaluates, or otherwise determines if the number of (m, n) value combinations that result in the bar being identified as a second bar exceeds a second threshold. If condition 331 is satisfied then method 350 proceeds to act 332 at which the bar in question is assigned to the second musical segment. In this way, the combination of condition 331 and act 332 in method 350 completes act 330 of method 300 for bars that satisfy condition 331. Similar to condition 321 and act 322 above, some implementations of condition 331 and act 332 may iterate over multiple thresholds.

As described above, in some implementations method 350 may also include act 392, which is only triggered if condition 391 is satisfied. Condition 391 is essentially a catch-all that checks, assesses, evaluates, or otherwise determines if neither condition 321 nor condition 331 is satisfied. That is, per condition 391, if the number of (m, n) value combinations that result in the bar being identified as a first bar does not exceed the first threshold and the number of (m, n) value combinations that result in the bar being identified as a second bar does not exceed the second threshold, then act 392 may be triggered. At 392, rather than specifically assigning the bar to a first musical segment (per 322) or a second musical segment (per 332), the bar is more generally assigned (e.g., by at least one processor) to a same musical segment as both a bar that directly precedes the bar in the musical composition and a bar that directly succeeds the bar in the musical composition. In other words, no new "first" or "second" musical segment is generated, created, or otherwise introduced. The bar is simply lumped into the same musical segment as its neighbors because the bar is not directly adjacent a boundary between adjacent musical segments.

Generally, in the field of music, a musical composition has a direction. That is, a musical composition typically progresses sequentially through a series of bars, beginning at a first bar and ending at a last bar. However, for the purposes of analyzing a musical composition (such as in order to automatically segment the musical composition as described herein), it may not be necessary to analyze the musical composition in the same direction in which it is intended to be played or listened to. Some implementations of the present systems, devices, and methods may analyze a musical composition (e.g., for the purpose of segmentation) by starting at the first bar, progressing sequentially forwards through all bars in order, and concluding at the last bar; but other implementations may start at the last bar, progress sequentially backwards through all bars in reverse order, and conclude at the first bar. Some implementations may start at a middle bar and loop around, connecting the first and last bars and concluding in the middle at a bar adjacent the starting middle bar. Some implementations may even analyze individual bars non-sequentially and/or out of order, such as by starting at a first bar and then immediately jumping to a second bar that is not adjacent to the first bar. However, for the purposes of illustration FIG. 4 provides an exemplary implementation of the present systems, devices, and methods in which the bars of a musical composition are analyzed in forwards sequential order beginning at the first bar of the musical composition and ending at the last bar of the musical composition.

Figure 4A:
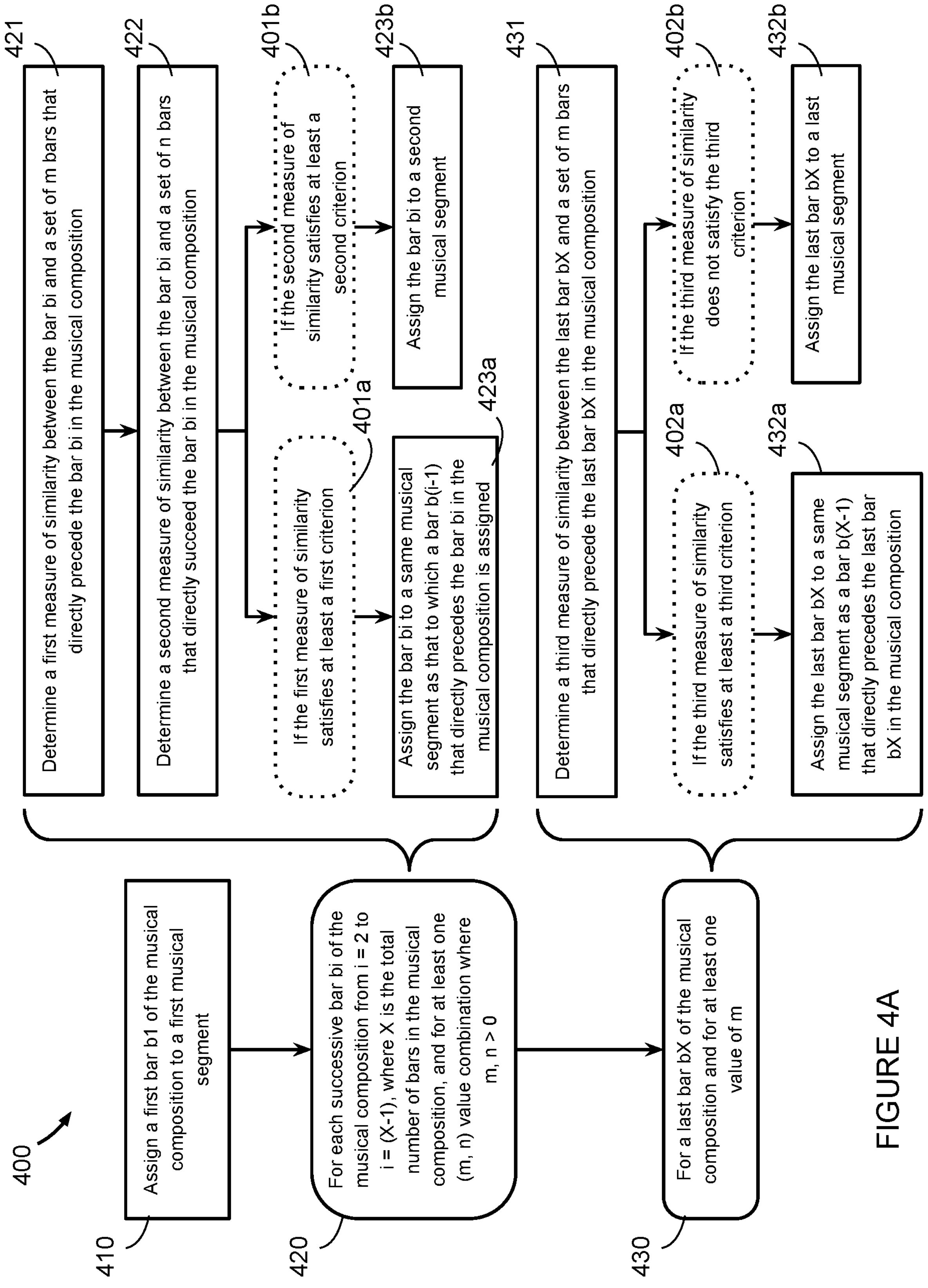
FIG. 4A is a flow diagram showing an exemplary computer-implemented method of segmenting a musical composition into musical segments in accordance with the present systems, devices, and methods.

FIG. 4A is a flow diagram showing an exemplary computer-implemented method 400 of segmenting a musical composition into musical segments in accordance with the present systems, devices, and methods. The musical composition being segmented by method 400 comprises a sequence of bars bi from i=1 to i=X (where i denotes the relative position of the bar in the musical composition) such as, for example, musical composition 100 from FIG. 1. Method 400 includes act 410 and specifications 420, and 430. Specification 420 applies to or characterizes acts 421 and 422, conditions or criteria 401*a* and 401*b*, and conditional acts 423*a* and 423*b*. Conditional act 423*a* is triggered/performed when condition/criterion 401*a* is satisfied or met and conditional act 423*b* is triggered/performed when condition/criterion 401*b* is satisfied or met. Specification 430 applies to or characterizes act 431, conditions or criteria 402*a* and 402*b*, and conditional acts 432*a* and 432*b*. Conditional act 432*a* is triggered/performed when condition/criterion 402*a* is satisfied or met and conditional act 432*b* is triggered/performed when condition/criterion 402*b* is satisfied or met. Those of skill in the art will appreciate that in alternative implementations certain acts, specifications, criteria, and/or conditional acts may be omitted and/or additional acts, specifications, criteria, and/or conditional acts may be added. Those of skill in the art will also appreciate that the illustrated order of the acts, specifications, criteria, and/or conditional acts is shown for exemplary purposes only and may change in alternative implementations. Many features and elements of method 400 or similar to those described for method 200 and/or method 300 and descriptions thereof are not repeated at length or in depth in the context of method 400. A person of skill in the art will appreciate how related features and elements of method 200 and/or method 300 may be applied, or adapted to be applied, in method 400 and vice versa.

Method 400 employs the "bi" bar notation previously introduced in an exemplary implementation of method 300 above. For certainly, an illustrative example of such "bi" bar notation is provided in FIG. 4B.

Figure 4B:
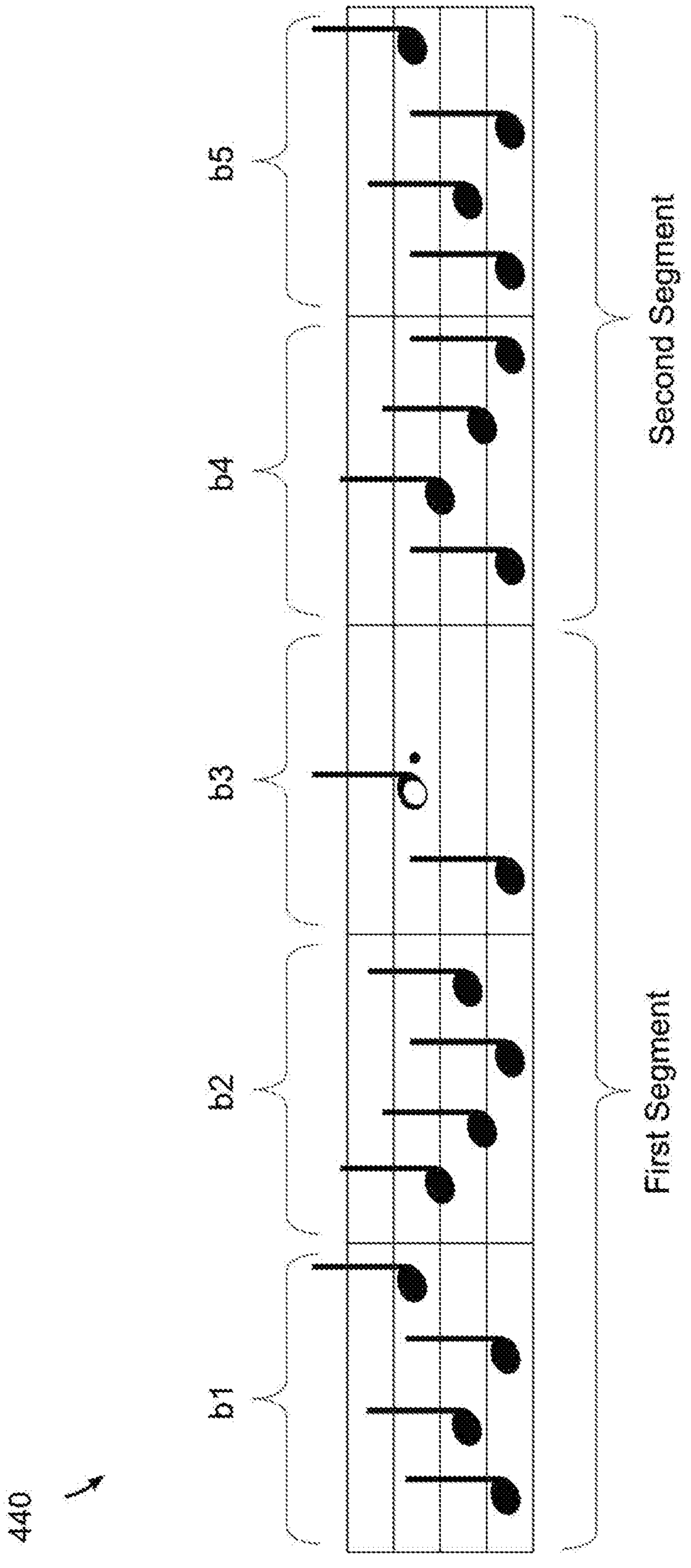
FIG. 4B is an illustrative diagram showing an arbitrary sequence of five (X=5) bars from an exemplary musical composition.

FIG. 4B is an illustrative diagram showing an arbitrary sequence of five (X=5) bars b1, b2, b3, b4, and b5 from an exemplary (excerpt from) musical composition 440. The purpose of FIG. 4B is to illustrate that, when using bi bar notation, b1 corresponds to the first or initial bar in the musical composition, b2 corresponds to the bar that directly succeeds b1, b3 corresponds to the bar that directly succeeds b2, and so on up to bX directly succeeding b(X−1) for all X bars in the musical composition. FIG. 4B shows a first musical segment comprising bars b1, b2, and b3 and a second musical segment comprising bars b4 and b5.

Returning to FIG. 4A, at 410 a first bar b1 of the musical composition is assigned to a first musical segment (e.g., by at least one processor). Some implementations of method 400 may operate on the assumption that each bar of the musical composition must be assigned to a musical segment, and therefore at 410 a first musical segment may simply be defined and the first bar b1 of the musical composition may be assigned to the first musical segment without further analysis or comparison.

At 420, it is specified that acts 421 and 422 and (either of) conditional acts 423*a*/423*b* are all carried out for each successive bar bi of the musical composition from i=2 to i=(X−1) and for at least one (m, n) value combination where m, n>0. For example, if the musical composition comprises X bars then acts 421 and 422 and (either of) conditional acts 423*a*/423*b* are all carried out for are carried out for the b2 bar, the b3 bar, the b4 bar, and so on in sequential order all the way up to the b(X−1) bar. In any given iteration or instance of acts 421 and 422 and (either of) conditionals acts 423*a*/423*b*, the bar for which acts 421 and 422 and (either of) conditionals acts 423*a*/423*b* are carried out serves as the bi bar with "i" indexed to match the relative position of the bar in the sequence of bars that makes up the musical composition. As a more specific example, if method 400 is applied to musical composition 100 of FIG. 1 then acts 421 and 422 and (either of) conditionals acts 423*a*/423*b* are carried out for each of bars 102, 103, 104, 105, 106, 107, 108, 109, 110, 111, 112, 113, 114, 115, 116, 117, 118, and 119.

At 421, a first measure of similarity between the bar bi and a set of m bars that directly precede the bar bi in the musical composition is determined, e.g., by at least one processor. Some implementations of act 421 may be substantially similar to act 210 from method 200 (with bar bi substituting for the $j^{th}$ bar) and, likewise, some implementations of act 421 may include sub-acts (not illustrated to avoid being duplicative) analogous to sub-acts 211 and 212. Specifically, in some implementations of method 400 act 421 may include determining a respective measure of similarity between the bar bi and each respective bar {b(i−1), . . . , b(i−m)} in the set of m bars that directly precede the bar bi in the musical composition. In such implementations, determining the first measure of similarity between the bar bi and a set of m bars that directly precede the bar bi in the musical composition may include determining, as the first measure of similarity, a property of the respective measures of similarity between the bar bi and each respective bar {b(i−1), . . . , b(i−m)} in the set of m bars that directly precede the bar bi in the musical composition. Returning to FIG. 4B for illustrative example, in the case where the 3rd bar b3 is the bar being analyzed (i.e., i=3) and m=2, an implementation of act 421 may include: i) determining (e.g., by at least one processor) a measure of similarity between bar b3 and bar b2 and also determining a measure of similarity between bar b3 and bar b1; and ii) determining a property of both the measure of similarity determined between bar b3 and bar b2 and the measure of similarity determined between bar b3 and bar b1.

At 422, a second measure of similarity between the bar bi and a set of n bars that directly succeed the bar bi in the musical composition is determined, e.g., by at least one processor. Some implementations of act 422 may be substantially similar to act 220 from method 200 (with bar bi substituting for the $j^{th}$ bar) and, likewise, some implementations of act 422 may include sub-acts (not illustrated to avoid being duplicative) analogous to sub-acts 221 and 222. Specifically, in some implementations of method 400 act 422 may include determining a respective measure of similarity between the bar bi and each respective bar {b(i+1), . . . , b(i+n)} in the set of n bars that directly succeed the bar bi in the musical composition. In such implementations, determining a second measure of similarity between the bar bi and a set of n bars that directly succeed the bar bi in the musical composition may include determining, as the second measure of similarity, a property of the respective measures of similarity between the bar bi and each respective bar {b(i+1), . . . , b(i+n)} in the set of n bars that directly succeed the bar bi in the musical composition. Returning to FIG. 4B for illustrative example, in the case where the 3rd bar b3 is the bar being analyzed (i.e., i=3) and n=2, an implementation of act 422 may include: i) determining (e.g., by at least one processor) a measure of similarity between bar b3 and bar b4 and also determining a measure of similarity between bar b3 and bar b5; and ii) determining a property of both the measure of similarity determined between bar b3 and bar b4 and the measure of similarity determined between bar b3 and bar b5.

In even further detail, and by even further analogy to acts 210 and 220 from method 200, the respective measures of similarity and/or the respective properties of the measures of similarity determined at 421 and 422, may, in some implementations, include distance measures such as correlation distances and/or cosine distances. For example, determining a respective measure of similarity between the bar bi and each respective bar {b(i−1), . . . , b(i−m)} in the set of m bars that directly precede the bar bi in the musical composition at 421 may include determining a respective correlation distance between the bar bi and each respective bar {b(i−1), . . . , b(i−m)} in the set of m bars that directly precede the bar bi in the musical composition. Similarly, determining a respective measure of similarity between the bar bi and each respective bar {b(i+1), . . . , b(i+n)} in the set of n bars that directly succeed the bar bi in the musical composition may include determining a respective correlation distance between the bar bi and each respective bar {b(i+1), . . . , b(i+n)} in the set of n bars that directly succeed the bar bi in the musical composition.

Further details previously described for method 200 may similarly be applied or invoked in method 400. For example, when the measures of similarity determined at 421 and 422 include distance measures such as correlation distances, determining a property of the respective measures of similarity may include determining a property (e.g., a minimum or, generally, a mathematical function) of a corresponding set of correlation distances. As another example, the measures of similarity determined at 421 and 422 may include or make use of any of a wide range of different features of the bars being analyzed. As non-limiting examples, acts 421 and 422 of method 400 may include determining "energy per bar per track" and/or "octaveless parallel note sequence per bar per track."

For any given bar bi, an implementation of method 400 may include conditional act 423*a* if the bar bi satisfies condition 401*a* or the implementation of method 400 may include conditional act 423*b* if the bar bi satisfies condition 401*b*. Similar to condition 202*a* from method 200, condition 401*a* of method 400 checks, assesses, tests, or otherwise evaluates whether the first measure of similarity determined at 421 satisfies a first criterion. And similar to condition 202*b* from method 200, condition 401*b* of method 400 checks, assesses, tests, or otherwise evaluates whether the second measure of similarity determined at 422 satisfies a second criterion. If condition 401*a* is satisfied then conditional act 423*a* is triggered or performed, and if condition 401*b* is satisfied then conditional act 423*b* is triggered or performed. As is the case for conditions 202*a* and 202*b* of method 200, conditions 401*a* and 401*b* of method 400 may, in some implementations, be structured such that any given bar bi in the range i=2 to i=(X−1) (i.e., any bar bi analyzed at 420 of method 400) may only satisfy one of condition 401*a* or condition 401*b* at a time. For example, conditions 401*a* and 401*b* may be structured relative to one another, such as "if the first measure of similarity determined at 421 indicates a higher degree of similarity than the second measure of similarity determined at 422" (for 401*a*) and "if the second measure of similarity determined at 422 indicates a higher degree of similarity than the first measure of similarity determined at 421" (for 401*b*). In some implementations, first condition 401*a* may include a first threshold value and second condition 401*b* may include a second threshold value, each as previously described for method 200.

At 423*a* (i.e., if the first measure of similarity determined at 421 satisfies at least a first criterion 401*a*), the bar bi is assigned (e.g., by at least one processor) to a same musical segment as that to which a bar b(i−1) that directly precedes the bar bi in the musical composition is assigned. Due to the sequential nature of method 400 (i.e., because method 400 processes the X bars of the musical composition in sequence starting at bar b1, moving on the bar b2, then to bar 3, and on and on to the final bar bX), and because at 410 bar b1 is assigned to a first musical segment, method 400 essentially involves checking (i.e., at 401*a*) to see if the bar bi is sufficiently musically similar to the m bars that precede it such that the bar bi should be lumped into the same musical segment as at least the bar b(i−1) that directly precedes it. When this is the case, condition 401*a* is satisfied, act 423*a* is triggered, and the bar bi is assigned to the same musical segment as the bar b(i−1) that directly precedes it. However, when this is not the case (i.e., when the bar bi is more musically similar to the n bars that succeed it than it is to the m bars that precede it), a musical transition or boundary between segments has been reached and condition 401*b* is satisfied. This causes act 423*b* to be triggered or performed rather than act 423*a*.

At 423*b* (which is only triggered if the second measure of similarity determined at 422 satisfies at least a second criterion 401*b*), a new or "additional" musical segment is created/defined and the bar bi is assigned to the new/additional musical segment. In other words, when act 423*b* is triggered the bar bi being analyzed has been determined to be more musically similar to the n bars that succeed it than to the m bars that precede it—but at this point in the performance of method 400 there is no musical segment corresponding to the n bars that succeed the bar bi because method 400 has, to this point, only performed segment assignments for the bars that precede the bar bi and has not performed such assignments for the bars that succeed the bar bi. Therefore, at 423*b* the bar bi is not assigned to the same musical segment as the bar b(i−1) that directly precedes it, but instead an additional musical segment is created/defined and the bar bi is assigned to the additional musical segment. Thus, in some implementations method 400 involves adding successive bars to an ever-growing set or cluster of musically-similar bars (i.e., nucleating a musical segment) until a musical transition or boundary is identified, at which point the ever-growing set or cluster is complete (i.e., the musical segment "nucleus" is formed) and a new or "additional" musical segment is created or defined. The first bar across the transition/boundary between the nucleated musical segment and the additional musical segment is assigned to the additional musical segment. From there, successive bars that are more similar to preceding bars in the additional musical segment than they are to succeeding bars may sequentially be assigned to the additional musical segment (i.e., the additional musical segment may be nucleated) until another musical transition or boundary is identified (i.e., until a bar bZ is found to be more musically similar to the bars that succeed it than to the bars that precede it), at which point nucleation of the additional musical segment is complete and yet another new/additional musical segment may be created or defined. The bar bZ, being the first bar across the transition/boundary between the additional musical segment and the yet another additional musical segment, may be assigned to the yet another additional musical segment. This process of successively nucleating musical segments is continued, per 420, for all non-end point bars of the musical composition (i.e., for b2 to b(X−1)) and for at least one (m, n) value combination until the final bar of the musical composition, bX, is reached.

At 430, it is specified that act 431 and (either of) conditional acts 432*a*/432*b* are all carried out for the last bar bX of the musical composition and for at least one value of m. "At least one value of m" is specified at 430 as opposed to "at least one (m, n) value combination" (as in 420) because there are no bars that succeed the last bar bX and therefore necessarily n=0 for the last bar bX.

At 431, a third measure of similarity between the last bar bX and a set of m bars that directly precede the last bar bX is determined, e.g., by at least one processor. Features and details of the third measure of similarity, and the manner in which it is determined, may be substantially similar to those described for the first measure of similarity determined at 421.

Once the third measure of similarity between the last bar bX and the set of m bars that directly precede the last bar bX has been determined, method 400 checks to see if the third measure of similarity satisfies at least a third criterion (i.e., at conditions 402*a* and 402*b*). If the at least a third criterion is satisfied, condition 402*a* is satisfied and conditional act 432*a* is triggered or performed. If the third criterion is not satisfied, condition 402*b* is satisfied and conditional act 432*b* is triggered or performed.

At 432*a* (which is only triggered when condition 402*a* is satisfied), the last bar bX of the musical composition is assigned to a same musical segment as a bar b(X−1) that directly precedes the last bar bX in the musical composition. In other words, condition 402*a* is satisfied when the last bar bX is sufficiently musically similar to the m bars that precede it such that the last bar bX belongs in (and is therefore assigned to at 432*a*) the same musical segment as at least the bar b(X−1) that directly precedes it in the musical composition.

At 432*b* (which is only triggered when condition 402*b* is satisfied—meaning condition 402*a* is not satisfied), the last bar bX of the musical composition is assigned to a last musical segment. In other words, condition 402*b* is satisfied when the last bar bX is sufficiently musically dissimilar from the m bars that precede it such that the last bar does not belong in (and is therefore not assigned to) the same musical segment as the bar b(X−1) that directly precedes it in the musical composition. Since, in this scenario where conditional act 432*b* is triggered, the last bar bX is not added to the same musical segment as the bar b(X−1) that directly precedes it, conditional act 433*b* completes the segmentation of the musical composition by creating or defining a "last" musical segment and assigning the last bar bX to the last musical segment. In some implementations (e.g., when conditional act 432*b* is triggered), the last musical segment may comprise only one bar: the last bar bX.

Just like methods 200 and 300, method 400, or at least portions thereof, may advantageously be iterated over any number of different (m, n) value combinations and/or any number of different threshold values in order to produce more complete and/or statistically-supported segmentation results. An example of how the result of method 400 may be further refined with additional iterations employing different (m, n) value combinations is provided in FIG. 4C.

Figure 4C:
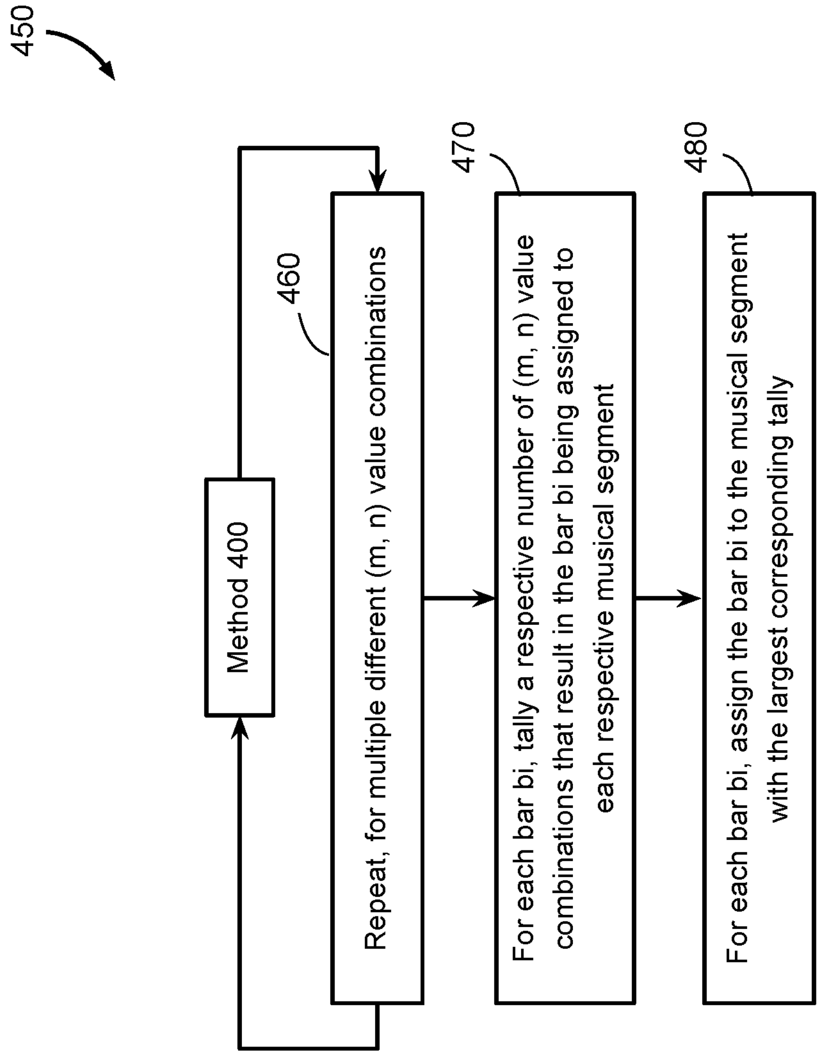
FIG. 4C is a flow diagram showing an exemplary computer-implemented method of segmenting a musical composition into musical segments in accordance with the present systems, devices, and methods.

FIG. 4C is a flow diagram showing an exemplary computer-implemented method 450 of segmenting a musical composition into musical segments in accordance with the present systems, devices, and methods. Method 450 is an extension of method 400 and, unless the specific context requires otherwise, includes all of the acts and details of FIG. 4A described previously.

Method 450 begins at 460 where method 400 is repeated for multiple different (m, n) value combinations. Act 410 of method 400 may be the same for each iteration performed at 460 of method 450 because act 410 does not necessarily depend on m or n values. Each iteration of acts 421, 422, and 423*a/b* performed at 460 may employ a different (m, n) value combination, wherein either or both of the m value and/or the n value may change across iterations. Each iteration of acts 431 and 432*a/b* may employ a different (m, n) value combination even though necessarily n=0 for acts 431 and 432*a/b*. More specifically, each iteration of acts 431 and 432*a/b* may employ a different (m, 0) value combination where only the m value changes across iterations.

Each instance or iteration of method 400 performed at 460 includes a respective instance or iteration of conditional act 423*a* or conditional act 423*b* (depending on how the first and second measures of similarity compare to the first condition 401*a* and the second condition 401*b*, respectively) for each bar bi in the range of i=2 to i=(X−1). Therefore, for each bar bi in the range i=2 to i=(X−1), each instance or iteration of method 400 performed at 460 results in the bar bi being assigned to either: a) a same musical segment as that to which a bar b(i−1) that directly precedes the bar bi in the musical composition is assigned at 423*a*; or *b*) an additional musical segment at 423*b*.

Similarly, each instance or iteration of method 400 performed at 460 includes a respective instance or iteration of conditional act 432*a* or conditional act 432*b* (depending on how the third measure of similarity compares to the third criterion at conditions 402*a* and 402*b*, respectively) for the last bar bX of the musical composition. Therefore, for the last bar bX of the musical composition, each instance or iteration of method 400 performed at 460 results in the bar bX being assigned to either: a) a same musical segment as a bar b(X−1) that directly precedes the last bar bX in the musical composition at 432*a*; or *b*) a last musical segment at 432*b*.

Once all of the iterations of method 400 are completed at 460 (the exact number depending on the specific implementation and the number of unique (m, n) value combinations explored), method 450 proceeds to acts 470 and 480.

At 470, for each bar bi a respective number of (m, n) value combinations that result in the bar bi being assigned to each respective musical segment is tallied, e.g., by at least one processor. That is, for each bar bi, a number of different (m, n) value combinations that result in the bar bi being assigned to the first musical segment is tallied, a number of different (m, n) value combinations that result in the bar bi being assigned to a second (e.g., a first "additional") musical segment is tallied, a number of different (m, n) value combinations that result in the bar bi being assigned to a third (e.g., a second "additional") musical segment is tallied, and so on, for all musical segments created or defined all the way up to the last musical segment. For example, if 50 different (m, n) value combinations are implemented at 460 and 7 different musical segments are ultimately created or defined, then at 470 a frequency mapping is determined that represents how many times (i.e., for how many of the 50 different (m, n) value combinations explored) each bar bi is assigned to each respective one of the 7 different musical segments.

At 480, for each bar bi, the bar bi is assigned (e.g., by at least one processor) to the musical segment with the largest corresponding tally. That is, at 480 each bar bi is assigned to the musical segment for which the largest corresponding tally was determined at 470. Continuing the previous example of 50 different (m, n) value combinations and 7 different musical segments, if at 470 the sixteenth bar b16 is found to map to the 7 musical segments as follows:

| Segment # | Tally |
|---|---|
| 1 | 2 |
| 2 | 7 |
| 3 | 11 |
| 4 | 23 |
| 5 | 4 |
| 6 | 3 |
| 7 | 0 |

then at 480 the sixteenth bar b16 may be assigned to musical segment #4 because musical segment #4 corresponds to the musical segment with the largest corresponding tally of different (m, n) value combinations for the sixteenth bar b16.

As previously described, method 400 (and therefore method 450) may also be iterated over different threshold values for conditions 401*a/b* and/or conditions 402*a/b* which may add another dimension or layer or permutations to the exemplary tallies discussed above. And as also previously described, aggregation techniques other than tallies (such as a random forest technique) may be employed in alternative implementations.

Although unlikely when the number of different (m, n) value combinations (and, optionally, the number of different threshold values) explored is large, in situations where there is a tie between two or more different musical segments for the largest tally for any given bar bi, a convention may be defined and adopted, such as: "assign the bar bi to a same musical segment as the bar b(i−1) that directly precedes the bar bi in the musical composition."

The various implementations described herein often make reference to "computer-based," "computer-implemented," "at least one processor," "a non-transitory processor-readable storage medium," and similar computer-oriented terms. A person of skill in the art will appreciate that the present systems, devices, and methods may be implemented using or in association with a wide range of different computing/processing hardware configurations, including localized hardware configurations (e.g., a desktop computer, laptop, smartphone, or similar) and/or distributed hardware configurations that employ hardware resources located remotely relative to one another and communicatively coupled through a network, such as a cellular network or the internet. For the purpose of illustration, an exemplary computer system suitable for implementing the present systems, devices, and methods is provided in FIG. 5.

FIG. 5 is an illustrative diagram of a processor-based computer system 500 suitable at a high level for segmenting a musical composition in accordance with the present systems, devices, and methods. Although not required, some portion of the implementations are described herein in the general context of data, processor-executable instructions or logic, such as program application modules, objects, or macros executed by one or more processors. Those skilled in the art will appreciate that the described implementations, as well as other implementations, can be practiced with various processor-based system configurations, including handheld devices, such as smartphones and tablet computers, multiprocessor systems, microprocessor-based or programmable consumer electronics, personal computers ("PCs"), network PCs, minicomputers, mainframe computers, and the like.

Processor-based computer system 500 includes at least one processor 501, a non-transitory processor-readable storage medium or "system memory" 502, and a system bus 510 that communicatively couples various system components including the system memory 502 to the processor(s) 501. Processor-based computer system 500 is at times referred to in the singular herein, but this is not intended to limit the implementations to a single system, since in certain implementations there will be more than one system or other networked computing device(s) involved. Non-limiting examples of commercially available processors include, but are not limited to: Core microprocessors from Intel Corporation, U.S.A., PowerPC microprocessor from IBM, ARM processors from a variety of manufacturers, Sparc microprocessors from Sun Microsystems, Inc., PA-RISC series microprocessors from Hewlett-Packard Company, and 68xxx series microprocessors from Motorola Corporation.

The processor(s) 501 of processor-based computer system 500 may be any logic processing unit, such as one or more central processing units (CPUs), microprocessors, digital signal processors (DSPs), application-specific integrated circuits (ASICs), field programmable gate arrays (FPGAs), and/or the like. Unless described otherwise, the construction and operation of the various blocks shown in FIG. 5 may be presumed to be of conventional design. As a result, such blocks need not be described in further detail herein as they will be understood by those skilled in the relevant art.

The system bus 510 in the processor-based computer system 500 may employ any known bus structures or architectures, including a memory bus with memory controller, a peripheral bus, and/or a local bus. The system memory 502 includes read-only memory ("ROM") 521 and random access memory ("RAM") 522. A basic input/output system ("BIOS") 523, which may or may not form part of the ROM 521, may contain basic routines that help transfer information between elements within processor-based computer system 500, such as during start-up. Some implementations may employ separate buses for data, instructions and power.

Processor-based computer system 500 (e.g., system memory 502 thereof) may include one or more solid state memories, for instance, a Flash memory or solid state drive (SSD), which provides nonvolatile storage of processor-executable instructions, data structures, program modules and other data for processor-based computer system 500. Although not illustrated in FIG. 5, processor-based computer system 500 may, in alternative implementations, employ other non-transitory computer- or processor-readable storage media, for example, a hard disk drive, an optical disk drive, or a memory card media drive.

Program modules in processor-based computer system 500 may be stored in system memory 502, such as an operating system 524, one or more application programs 525, program data 526, other programs or modules 527, and drivers 528.

The system memory 502 in processor-based computer system 500 may also include one or more communications program(s) 529, for example, a server and/or a Web client or browser for permitting processor-based computer system 500 to access and exchange data with other systems such as user computing systems, Web sites on the Internet, corporate intranets, or other networks as described below. The communications program(s) 529 in the depicted implementation may be markup language based, such as Hypertext Markup Language (HTML), Extensible Markup Language (XML) or Wireless Markup Language (WML), and may operate with markup languages that use syntactically delimited characters added to the data of a document to represent the structure of the document. A number of servers and/or Web clients or browsers are commercially available such as those from Google (Chrome), Mozilla (Firefox), Apple (Safari), and Microsoft (Internet Explorer).

While shown in FIG. 5 as being stored locally in system memory 502, operating system 524, application programs 525, program data 526, other programs/modules 527, drivers 528, and communication program(s) 529 may be stored and accessed remotely through a communication network or stored on any other of a large variety of non-transitory processor-readable media (e.g., hard disk drive, optical disk drive, SSD and/or flash memory).

Processor-based computer system 500 may include one or more interface(s) to enable and provide interactions with a user, peripheral device(s), and/or one or more additional processor-based computer system(s). As an example, processor-based computer system 500 includes interface 530 to enable and provide interactions with a user of processor-based computer system 500. A user of processor-based computer system 500 may enter commands, instructions, data, and/or information via, for example, input devices such as computer mouse 531 and keyboard 532. Other input devices may include a microphone, joystick, touch screen, game pad, tablet, scanner, biometric scanning device, wearable input device, and the like. These and other input devices (i.e., "I/O devices") are communicatively coupled to processor(s) 501 through interface 530, which may include one or more universal serial bus ("USB") interface(s) that communicatively couples user input to the system bus 510, although other interfaces such as a parallel port, a game port or a wireless interface or a serial port may be used. A user of processor-based computer system 500 may also receive information output by processor-based computer system 500 through interface 530, such as visual information displayed by a display monitor 533 and/or audio information output by one or more speaker(s) 534. Monitor 533 may, in some implementations, include a touch screen.

As another example of an interface, processor-based computer system 500 includes network interface 540 to enable processor-based computer system 500 to operate in a networked environment using one or more of the logical connections to communicate with one or more remote computers, servers and/or devices (collectively, the "Cloud" 541) via one or more communications channels. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, network interface 540 may include one or more wired or wireless communications interfaces, such as network interface controllers, cellular radios, WI-FI radios, and/or Bluetooth radios for establishing communications with the Cloud 541, for instance, the Internet or a cellular network.

In a networked environment, program modules, application programs or data, or portions thereof, can be stored in a server computing system (not shown). Those skilled in the relevant art will recognize that the network connections shown in FIG. 5 are only some examples of ways of establishing communications between computers, and other connections may be used, including wirelessly.

For convenience, processor(s) 501, system memory 502, interface 530, and network interface 540 are illustrated as communicatively coupled to each other via the system bus 510, thereby providing connectivity between the above-described components. In alternative implementations, the above-described components may be communicatively coupled in a different manner than illustrated in FIG. 5. For example, one or more of the above-described components may be directly coupled to other components, or may be coupled to each other via intermediary components (not shown). In some implementations, system bus 510 may be omitted with the components all coupled directly to each other using suitable connections.

In accordance with the present systems, devices, and methods, processor-based computer system 500 may be used to implement any or all of methods 200, 250, 300, 350, 400, and/or 450 described herein and/or store, play, process, segment, encode, compose, and manipulate musical compositions. Where the descriptions of methods 200, 250, 300, 350, 400, and/or 450 make reference to an act being performed by at least one processor (or even where such description is not explicitly stated but a person of skill in the art would understand that such act maybe performed by at least one processor), such act may be performed by processor(s) 501 of computer system 500 and may involve data and/or processor-executable instructions stored in system memory 502 of computer system 500.

Computer system 500 is an illustrative example of a system for segmenting a musical composition, the system comprising at least one processor 501, at least one non-transitory processor-readable storage medium 502 communicatively coupled to the at least one processor 501 (e.g., by system bus 510), and the various other hardware and software components illustrated in FIG. 5 (e.g., operating system 524, mouse 531, etc.). In particular, in order to enable system 500 to implement the present systems, devices, and methods, system memory 502 stores a computer program product 550 comprising processor-executable instructions and/or data 551 that, when executed by processor(s) 501, cause processor(s) 501 to perform the various processor-based acts of methods 200, 250, 300, 350, 400, and/or 450 as described herein. Using method 200 as an example, the processor-executable instructions and/or data 551 of computer program product 550 stored in system memory 502 may, when executed by processor(s) 501, cause processor(s) 501 to, for each $j^{th}$ bar of a musical composition and for at least one (m, n) value combination where m, n≥0 (per specification 201): determine a first measure of similarity between the $j^{th}$ bar and a set of m bars that directly precede the $j^{th}$ bar in the musical composition per act 210 of method 200; determine a second measure of similarity between the $j^{th}$ bar and a set of n bars that directly succeed the $j^{th}$ bar in the musical composition per act 220 of method 200; and either i) assign the $j^{th}$ bar to a first musical segment per act 230*a* of method 200 if the first measure of similarity satisfies at least a first criterion per condition 202*a* of method 200, or ii) assign the $j^{th}$ bar to a second musical segment per act 230*b* of method 200 if the second measure of similarity satisfies at least a second criterion per condition 202*b* of method 200. A person of skill in the art will appreciate that processor-executable instructions and/or data 551 may similarly (either instead or additionally) encode and, when executed by processor(s) 501, cause processor(s) 501 to perform various acts of methods 250, 300, 350, 400, and/or 450.

Throughout this specification and the appended claims, the term "computer program product" is used to refer to a package, combination, or collection of software comprising processor-executable instructions and/or data (e.g., 551) that may be accessed by (e.g., through a network such as cloud 541) or distributed to and installed on (e.g., stored in a local non-transitory processor-readable storage medium such as system memory 502) a computer system (e.g., computer system 500) in order to enable certain functionality (e.g., application(s), program(s), and/or module(s)) to be executed, performed, or carried out by the computer system.

Computer program product 550, and therefore computer system 500 when computer program product 550 is either accessed through network 540 or stored in system memory 502, may also be configured to generate a musical composition prior to segmentation and/or to further process a musical composition after segmentation. For example, computer program product 550 (e.g., processor-executable instructions and/or data 551 thereof) may, when executed or otherwise engaged by processor(s) 501, further cause computer system 500 to generate or compose one or more variation(s) of a musical composition that has been segmented by computer system 500, and the generation/composition of such one or more variation(s) may advantageously employ the segmentation information resulting from implementation(s0 of any or all of methods 200, 250, 300, 350, 400, and/or 450.

The various implementations described herein improve the functioning of computer systems for the specific practical application of automatic segmentation of musical compositions, which is useful in many ways including (without limitation) in the algorithmic composition of music. Segmenting a musical composition into separate discrete musical segments enables exceptional (relative to other approaches in the art) algorithmic control to set, vary, manipulate, and rearrange the various components of a musical composition. By identifying distinct musical segments, a user or algorithm can (a) re-order (and possibly modify) the segments to create new arrangements, and/or (b) enforce consistent musical variations to be made on repeated segments, thereby enhancing the overall musical coherence of the variation. These are just some examples of the capabilities, enabled by segmentation, that may be applied in new and improved software and applications for computer-based music composition to produce more sophisticated and enjoyable musical results. Additionally, there are many other ways in which the present systems, devices, and methods advantageously improve the use of computers for generating music, including without limitation, enabling respective musical segments to be defined and manipulated independently of one another and enabling certain parametric relationships (e.g., timing relationships) to be preserved across different segments (or variations of segments) while other parametric relationships are varied across different segments (or variations of segments).

Even beyond the field of computer-based music composition, the present systems, devices, and methods for segmentation have utility in other applications that involve processing music. For example, many applications that involve computer-processing of music today (such as, for example, labeling, mood/genre classification, and so on) simply rely on arbitrary excerpts from a musical composition and are not well-suited to account for situations where properties (e.g., mood/genre or any other label) may change within a musical composition. The systems, devices, and methods for segmentation described herein enable such computer-processing to be performed using identified musically-coherent segments of a musical composition rather than using arbitrary excerpts from a musical composition, which helps to ensure more consistent and coherent computer-processing results.

Throughout this specification and the appended claims, reference is often made to musical compositions being "automatically" generated/composed by computer-based algorithms, software, and/or artificial intelligence (AI) techniques. A person of skill in the art will appreciate that a wide range of algorithms and techniques may be employed in computer-generated music, including without limitation: algorithms based on mathematical models (e.g., stochastic processes), algorithms that characterize music as a language with a distinct grammar set and construct compositions within the corresponding grammar rules, algorithms that employ translational models to map a collection of non-musical data into a musical composition, evolutionary methods of musical composition based on genetic algorithms, and/or machine learning-based (or AI-based) algorithms that analyze prior compositions to extract patterns and rules and then apply those patterns and rules in new compositions. These and other algorithms may be advantageously adapted to exploit the features and techniques enabled by the segmentation of music described herein.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A computer-implemented method of segmenting a musical composition into musical segments, the method comprising:

for each bar of the musical composition that is not an initial bar of the musical composition or a last bar of the musical composition:

determining a first measure of similarity between the bar and at least one bar that directly precedes the bar in the musical composition;

determining a second measure of similarity between the bar and at least one bar that directly succeeds the bar in the musical composition; and one of:

if the first measure of similarity satisfies at least a first criterion, assigning the bar to a first musical segment, wherein the first musical segment is a same musical segment to which the at least one bar that directly precedes the bar in the musical composition is also assigned; or if the second measure of similarity satisfies at least a second criterion, assigning the bar to a second musical segment, the second musical segment different from the first musical segment.

2. The method of claim 1 wherein the second musical segment is a same musical segment to which the at least one bar that directly succeeds the bar in the musical composition is also assigned.

3. The method of claim 1 wherein determining a first measure of similarity between the bar and at least one bar that directly precedes the bar in the musical composition includes determining a correlation distance between the bar and at least one bar that directly precedes the bar in the musical composition, and wherein determining a second measure of similarity between the bar and at least one bar that directly succeeds the bar in the musical composition includes determining a correlation distance between the bar and at least one bar that directly succeeds the bar in the musical composition.

4. The method of claim 1 wherein the first criterion includes a first threshold value that is representative of a measure of distance between the bar and the at least one bar that directly precedes the bar in the musical composition and the second criterion includes a second threshold value that is representative of a measure of distance between the bar and the at least one bar that directly succeeds the bar in the musical composition.

5. The method of claim 1, further comprising:

for the initial bar of the musical composition, assigning the initial bar to an initial musical segment.

6. The method of claim 5 wherein for a bar that directly succeeds the initial bar of the musical composition, determining a first measure of similarity between the bar and at least one bar that directly precedes the bar in the musical composition includes determining a first measure of similarity between the bar that directly succeeds the initial bar of the musical composition and the initial bar of the musical composition, and wherein:

if the first measure of similarity satisfies at least the first criterion, assigning the bar to a first musical segment includes assigning the bar that directly succeeds the initial bar of the musical composition to the initial musical segment; whereas if the second measure of similarity satisfies at least the second criterion, assigning the bar to a second musical segment includes assigning the bar that directly succeeds the initial bar of the musical composition to a musical segment that is different from the initial musical segment.

7. The method of claim 1, further comprising:

for the last bar of the musical composition:

determining a first measure of similarity between the last bar of the musical composition and at least one bar that directly precedes the last bar in the musical composition; and one of:

if the first measure of similarity satisfies at least a first criterion, assigning the last bar of the musical composition to a same musical segment as the at least one bar that directly precedes the last bar in the musical composition; or if the first measure of similarity does satisfy the at least a first criterion, assigning the last bar in the musical composition to a second musical segment, the second musical segment different from the musical segment to which the at least one bar that directly precedes the last bar in the musical composition is assigned.

8. A system for segmenting a musical composition into musical segments, the system comprising:

at least one processor; and a non-transitory processor-readable storage medium communicatively coupled to the at least one processor, the non-transitory processor-readable storage medium storing processor-executable instructions and/or data that, when executed by the at least one processor, cause the at least one processor to, for each bar of the musical composition that is not an initial bar of the musical composition or a last bar of the musical composition:

determine a first measure of similarity between the bar and at least one bar that directly precedes the bar in the musical composition;

determine a second measure of similarity between the bar and at least one bar that directly succeeds the bar in the musical composition; and one of:

if the first measure of similarity satisfies at least a first criterion, assign the bar to a first musical segment, wherein the first musical segment is a same musical segment to which the at least one bar that directly precedes the bar in the musical composition is also assigned; or if the second measure of similarity satisfies at least a second criterion, assign the bar to a second musical segment, the second musical segment different from the first musical segment.

9. The system of claim 8 wherein the second musical segment is a same musical segment to which the at least one bar that directly succeeds the bar in the musical composition is also assigned.

10. The system of claim 8 wherein the processor-executable instructions and/or data that, when executed by the at least one processor, cause the at least one processor to determine a first measure of similarity between the bar and at least one bar that directly precedes the bar in the musical composition, cause the at least one processor to determine a correlation distance between the bar and at least one bar that directly precedes the bar in the musical composition, and wherein the processor-executable instructions and/or data that, when executed by the at least one processor, cause the at least one processor to determine a second measure of similarity between the bar and at least one bar that directly succeeds the bar in the musical composition, cause the at least one processor to determine a correlation distance between the bar and at least one bar that directly succeeds the bar in the musical composition.

11. The system of claim 8 wherein the first criterion includes a first threshold value that is representative of a measure of distance between the bar and the at least one bar that directly precedes the bar in the musical composition and the second criterion includes a second threshold value that is representative of a measure of distance between the bar and the at least one bar that directly succeeds the bar in the musical composition.

12. The system of claim 8 wherein the non-transitory processor-readable storage medium further stores processor-executable instructions and/or data that, when executed by the at least one processor, cause the at least one processor to, for the initial bar of the musical composition, assign the initial bar to an initial musical segment.

13. The system of claim 12 wherein for a bar that directly succeeds the initial bar of the musical composition, the processor-executable instructions and/or data that, when executed by the at least one processor, cause the at least one processor to determine a first measure of similarity between the bar and at least one bar that directly precedes the bar in the musical composition, cause the at least one processor to determine a first measure of similarity between the bar that directly succeeds the initial bar of the musical composition and the initial bar of the musical composition, and wherein:

if the first measure of similarity satisfies at least the first criterion, the processor-executable instructions and/or data that, when executed by the at least one processor, cause the at least one processor to assign the bar to a first musical segment, cause the at least one processor to assign the bar that directly succeeds the initial bar of the musical composition to the initial musical segment; whereas if the second measure of similarity satisfies at least the second criterion, the processor-executable instructions and/or data that, when executed by the at least one processor, cause the at least one processor to assign the bar to a second musical segment, cause the at least one processor to assign the bar that directly succeeds the initial bar of the musical composition to a musical segment that is different from the initial musical segment.

14. The system of claim 8 wherein the non-transitory processor-readable storage medium further stores processor-executable instructions and/or data that, when executed by the at least one processor, cause the at least one processor to, for the last bar of the musical composition:

determine a first measure of similarity between the last bar of the musical composition and at least one bar that directly precedes the last bar in the musical composition; and one of:

if the first measure of similarity satisfies at least a first criterion, assign the last bar of the musical composition to a same musical segment as the at least one bar that directly precedes the last bar in the musical composition; or if the first measure of similarity does satisfy the at least a first criterion, assign the last bar in the musical composition to a second musical segment, the second musical segment different from the musical segment to which the at least one bar that directly precedes the last bar in the musical composition is assigned.

15. A computer program product comprising a non-transitory processor-readable storage medium storing processor-executable instructions and/or data that, when executed by at least one processor communicatively coupled to the non-transitory processor-readable storage medium, cause the at least one processor to, for each bar of the musical composition that is not an initial bar of the musical composition or a last bar of the musical composition:

determine a first measure of similarity between the bar and at least one bar that directly precedes the bar in the musical composition;

determine a second measure of similarity between the bar and at least one bar that directly succeeds the bar in the musical composition; and one of:

if the first measure of similarity satisfies at least a first criterion, assign the bar to a first musical segment, wherein the first musical segment is a same musical segment to which the at least one bar that directly precedes the bar in the musical composition is also assigned; or if the second measure of similarity satisfies at least a second criterion, assign the bar to a second musical segment, the second musical segment different from the first musical segment.

16. The computer program product of claim 15 wherein the second musical segment is a same musical segment to which the at least one bar that directly succeeds the bar in the musical composition is also assigned.

17. The computer program product of claim 15 wherein the non-transitory processor-readable storage medium further stores processor-executable instructions and/or data that, when executed by at least one processor communicatively coupled to the non-transitory processor-readable storage medium, cause the at least one processor to, for the initial bar of the musical composition, assign the initial bar to an initial musical segment, and wherein:

for a bar that directly succeeds the initial bar of the musical composition, the processor-executable instructions and/or data that, when executed by at least one processor communicatively coupled to the non-transitory processor-readable storage medium, cause the at least one processor to determine a first measure of similarity between the bar and at least one bar that directly precedes the bar in the musical composition, cause the at least one processor to determine a first measure of similarity between the bar that directly succeeds the initial bar of the musical composition and the initial bar of the musical composition, and wherein:

if the first measure of similarity satisfies at least the first criterion, the processor-executable instructions and/or data that, when executed by at least one processor communicatively coupled to the non-transitory processor-readable storage medium, cause the at least one processor to assign the bar to a first musical segment, cause the at least one processor to assign the bar that directly succeeds the initial bar of the musical composition to the initial musical segment; whereas if the second measure of similarity satisfies at least the second criterion, the processor-executable instructions and/or data that, when executed by at least one processor communicatively coupled to the non-transitory processor-readable storage medium, cause the at least one processor to assign the bar to a second musical segment, cause the at least one processor to assign the bar that directly succeeds the initial bar of the musical composition to a musical segment that is different from the initial musical segment.

18. The computer program product of claim 15 wherein the non-transitory processor-readable storage medium further stores processor-executable instructions and/or data that, when executed by at least one processor communicatively coupled to the non-transitory processor-readable storage medium, cause the at least one processor to, for the last bar of the musical composition:

determine a first measure of similarity between the last bar of the musical composition and at least one bar that directly precedes the last bar in the musical composition; and one of:

if the first measure of similarity satisfies at least a first criterion, assign the last bar of the musical composition to a same musical segment as the at least one bar that directly precedes the last bar in the musical composition; or if the first measure of similarity does satisfy the at least a first criterion, assign the last bar in the musical composition to a second musical segment, the second musical segment different from the musical segment to which the at least one bar that directly precedes the last bar in the musical composition is assigned.

* * * * *